(12) United States Patent
Feng

(10) Patent No.: US 9,754,503 B2
(45) Date of Patent: Sep. 5, 2017

(54) SYSTEMS AND METHODS FOR AUTOMATED SCORING OF A USER'S PERFORMANCE

(71) Applicant: Educational Testing Service, Princeton, NJ (US)

(72) Inventor: Gary Feng, Princeton, NJ (US)

(73) Assignee: Educational Testing Service, Princeton, NJ (US)

(*) Notice: Subject to any disclaimer, the term of this patent is extended or adjusted under 35 U.S.C. 154(b) by 230 days.

(21) Appl. No.: 14/666,686

(22) Filed: Mar. 24, 2015

(65) Prior Publication Data

US 2015/0269857 A1    Sep. 24, 2015

Related U.S. Application Data

(60) Provisional application No. 61/969,475, filed on Mar. 24, 2014.

(51) Int. Cl.
*G09B 7/00*    (2006.01)
*H04W 4/02*    (2009.01)
(Continued)

(52) U.S. Cl.
CPC ............... *G09B 7/00* (2013.01); *G10L 15/04* (2013.01); *G10L 17/26* (2013.01); *G10L 25/00* (2013.01);
(Continued)

(58) Field of Classification Search
USPC ................................................ 434/363, 353
See application file for complete search history.

(56) References Cited

U.S. PATENT DOCUMENTS 5,915,973 A * 6/1999 Hoehn-Saric ...... G07C 9/00158
                                                        434/118
8,441,548 B1 * 5/2013 Nechyba ................ H04N 5/228
                                                        348/222.1
(Continued)

OTHER PUBLICATIONS

Teachscape; Portable Kits for Video Capture; http://www.teachscape.com/videocaptureoptions/mini-camera-and-tablet-kits.; Jul. 5, 2014.
(Continued)

*Primary Examiner* — Sam Yao
*Assistant Examiner* — William Ermlick
(74) *Attorney, Agent, or Firm* — Jones Day

(57) ABSTRACT

Systems and methods are provided for evaluating a user's performance. A first mobile communications device is configured to capture first audio and visual data of a user's performance. The first audio and video data are analyzed by the first device during the user's performance to determine if audio and video quality requirements are met. A second mobile communications device is configured to capture second audio and visual data of the user's performance, the second visual data capturing a different field of view than the first visual data. The second audio and visual data are transmitted by the second device to a remote computing system. The transmitted data is analyzed at the remote computing system to determine if the user is receiving utilizing unauthorized material in the performance. A computer-based scoring system is configured to determine a score for the user's performance based on the first audio and visual data.

20 Claims, 12 Drawing Sheets

(51) Int. Cl.
  *G10L 15/04* (2013.01)
  *G10L 17/26* (2013.01)
  *G10L 25/00* (2013.01)
  *H04N 7/00* (2011.01)
  *H04N 17/00* (2006.01)
  *H04N 7/14* (2006.01)
  *G10L 15/26* (2006.01)

(52) U.S. Cl.
  CPC ............. *H04N 7/002* (2013.01); *H04N 7/147* (2013.01); *H04W 4/023* (2013.01); *G10L 15/26* (2013.01); *H04N 7/14* (2013.01); *H04N 17/00* (2013.01); *H04N 2007/145* (2013.01); *H04N 2017/006* (2013.01); *H04W 4/02* (2013.01)

(56) References Cited

U.S. PATENT DOCUMENTS

| | | | | |
|---|---|---|---|---|
| 8,941,741 | B1* | 1/2015 | McDonough | G06K 9/00288 348/161 |
| 9,154,748 | B2* | 10/2015 | Hsu | G06Q 10/10 |
| 2002/0172931 | A1* | 11/2002 | Greene | G09B 7/00 434/322 |
| 2005/0119894 | A1* | 6/2005 | Cutler | G10L 17/26 704/270 |
| 2007/0048723 | A1* | 3/2007 | Brewer | G09B 7/02 434/350 |
| 2007/0117082 | A1* | 5/2007 | Winneg | G09B 7/00 434/350 |
| 2007/0117083 | A1* | 5/2007 | Winneg | G09B 7/00 434/350 |
| 2009/0035740 | A1* | 2/2009 | Reed | G09B 23/288 434/265 |
| 2009/0197233 | A1* | 8/2009 | Rubin | G06Q 10/10 434/322 |
| 2011/0080254 | A1* | 4/2011 | Tran | G06K 9/00355 340/5.1 |
| 2011/0177484 | A1* | 7/2011 | Morgan | G09B 5/00 434/322 |
| 2011/0207108 | A1* | 8/2011 | Dorman | G09B 7/00 434/350 |
| 2011/0223576 | A1* | 9/2011 | Foster | G09B 7/02 434/362 |
| 2011/0244440 | A1* | 10/2011 | Saxon | G09B 7/02 434/362 |
| 2012/0034584 | A1* | 2/2012 | Logan | G09B 7/00 434/236 |
| 2012/0042358 | A1* | 2/2012 | Kondur | G06F 21/316 726/3 |
| 2012/0176220 | A1* | 7/2012 | Garcia | G06F 21/32 340/5.83 |
| 2012/0208168 | A1* | 8/2012 | Atkinson | G06Q 10/06398 434/362 |
| 2012/0244508 | A1* | 9/2012 | Katz | G09B 7/00 434/362 |
| 2013/0212507 | A1* | 8/2013 | Fedoseyeva | G06Q 10/00 715/765 |
| 2014/0227673 | A1* | 8/2014 | Yousef | G09B 5/00 434/350 |
| 2014/0240507 | A1* | 8/2014 | Hsu | G06Q 10/10 348/159 |
| 2014/0272882 | A1* | 9/2014 | Kaufman | G09B 5/065 434/308 |
| 2014/0302469 | A1* | 10/2014 | Chen | G09B 19/00 434/236 |
| 2014/0322683 | A1* | 10/2014 | Baym | G09B 19/00 434/219 |
| 2015/0037781 | A1* | 2/2015 | Breed | G09B 7/00 434/362 |
| 2015/0213722 | A1* | 7/2015 | Nypl | G09B 7/00 705/12 |

OTHER PUBLICATIONS

Swivl; http://www.swivl.com/; Feb. 27, 2014.
Belkin; LiveAction Mic; http://www.belkin.com/us/p/P-F8Z818/; Feb. 28, 2014.
SIC Biometrics; iFMID—Secure Access Control to Critical Data, Systems and Applications on Tablets; http://www.sic.ca/tablets/; Sep. 19, 2013.

\* cited by examiner

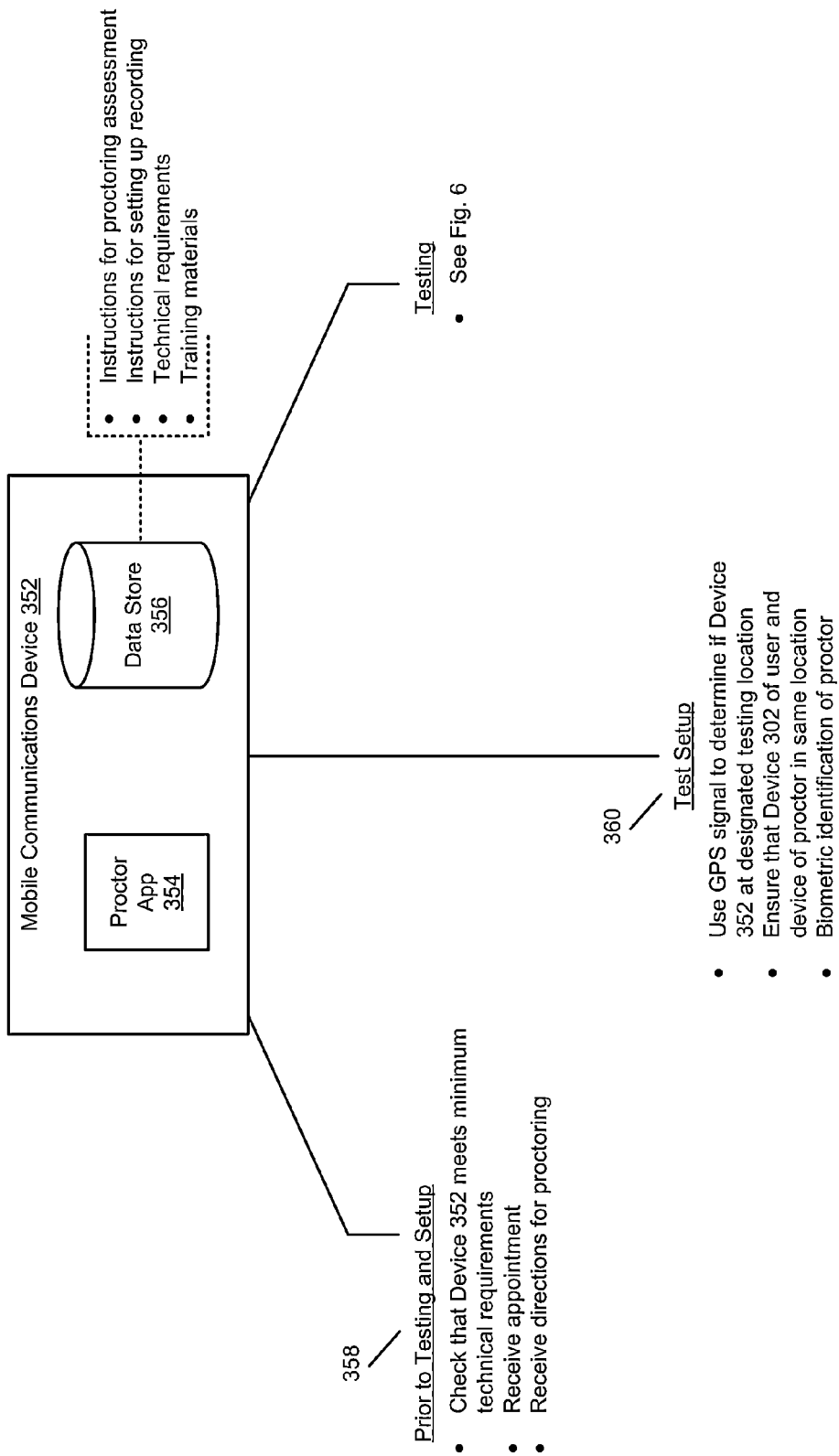

SYSTEMS AND METHODS FOR AUTOMATED SCORING OF A USER'S PERFORMANCE

CROSS-REFERENCE TO RELATED APPLICATIONS

This application claims priority to U.S. Provisional Patent Application No. 61/969,475, filed Mar. 24, 2014, entitled "Ideation for a DA4TEL Test App," which is incorporated herein by reference in its entirety.

FIELD

The technology described in this patent document relates generally to computer-based scoring systems and more particularly to a system and method for evaluating a video response to a performance-based assessment.

BACKGROUND

Certain assessments require a test-taker to complete a performance-based task. For example, assessments used in teacher licensing and certification require test-takers to complete a simulated teaching performance. In these assessments, the test-taker is provided a task and then given an amount of time to prepare to perform the task. The task may require the test-taker to complete a simulated teaching performance. Generally, such assessments are performed at a designated test center, and in a given day, multiple test-takers may travel to the designated test center to complete the assessment. For some of these test-takers, access to the test center may be difficult (e.g., some test-takers may live in remote areas that are far from a designated test center). One or more human scorers may be present at the designated test center, enabling them to view test-takers' performances in-person and assign scores to the performances.

SUMMARY

The present disclosure is directed to a computer-implemented method, system, and non-transitory computer-readable storage medium for evaluating a user's performance. An example system for evaluating a user's performance includes a first mobile communications device. The first mobile communications device is configured to capture first audio data and first visual data associated with a user's performance. The first mobile communications device is also configured to (i) analyze the first audio data during the user's performance to determine if the first audio data meets an audio quality requirement, and (ii) generate a first signal based on a determination that the first audio data does not meet the audio quality requirement. The first mobile communications device is also configured to (i) analyze the first visual data during the user's performance to determine if the first visual data meets a video quality requirement, and (ii) generate a second signal based on a determination that the first visual data does not meet the video quality requirement. A second mobile communications device is configured to capture second audio data and second visual data associated with the user's performance, the second visual data capturing a different field of view than the first visual data. The second mobile communications device is also configured to transmit the second audio data and the second visual data to a remote computing system. The second audio data and the second visual data are analyzed at the remote computing system to determine if the user is receiving unauthorized assistance or utilizing unauthorized material in the performance, and a third signal is transmitted from the remote computing system to the second mobile communications device based on a determination that the user is receiving the assistance or utilizing the material. The second mobile communications device is also configured to terminate the capturing of the audio and visual data by the first and second mobile communications devices based on a receipt of the first, second, or third signals. The second mobile communications device is configured to (i) receive the first and second signals from the first mobile communications device, and (ii) transmit a signal to the first mobile communications device to terminate the capturing of the first audio and visual data. A computer-based scoring system is configured to determine a score for the user's performance based on a plurality of numerical measures that are determined by processing the first audio data and the first visual data with a processing system. The score is determined automatically and without human intervention.

In an example computer-implemented method of evaluating a user's performance, using a first mobile communications device, first audio data and first visual data associated with the user's performance are captured. Using the first mobile communications device, the first audio data is analyzed during the user's performance to determine if the first audio data meets an audio quality requirement. Using the first mobile communications device, the first visual data is analyzed during the user's performance to determine if the first visual data meets a video quality requirement. Using a second mobile communications device, second audio data and second visual data associated with the user's performance are captured, the second visual data capturing a different field of view than the first visual data. Using the second mobile communications device, the second audio data and the second visual data are transmitted to a remote computing system. The second audio data and the second visual data are analyzed at the remote computing system to determine if the user is receiving unauthorized assistance or utilizing unauthorized material in the performance. Using a computer-based scoring system, a score for the user's performance is determined based on a plurality of numerical measures that are determined by processing the first audio data and the first visual data with a processing system. The score is determined automatically and without human intervention. In an example, one or more non-transitory computer readable media may comprise computer instructions, which when executed cause respective processing systems of the first mobile communications device, the second mobile communications device, and the remote computer systems to carry out the above-described functionality.

BRIEF DESCRIPTION OF THE DRAWINGS

FIG. 3 illustrates example features of a mobile communications device that executes a proctor app used in a system for evaluating a user's performance.

DETAILED DESCRIPTION

Figure 1A:
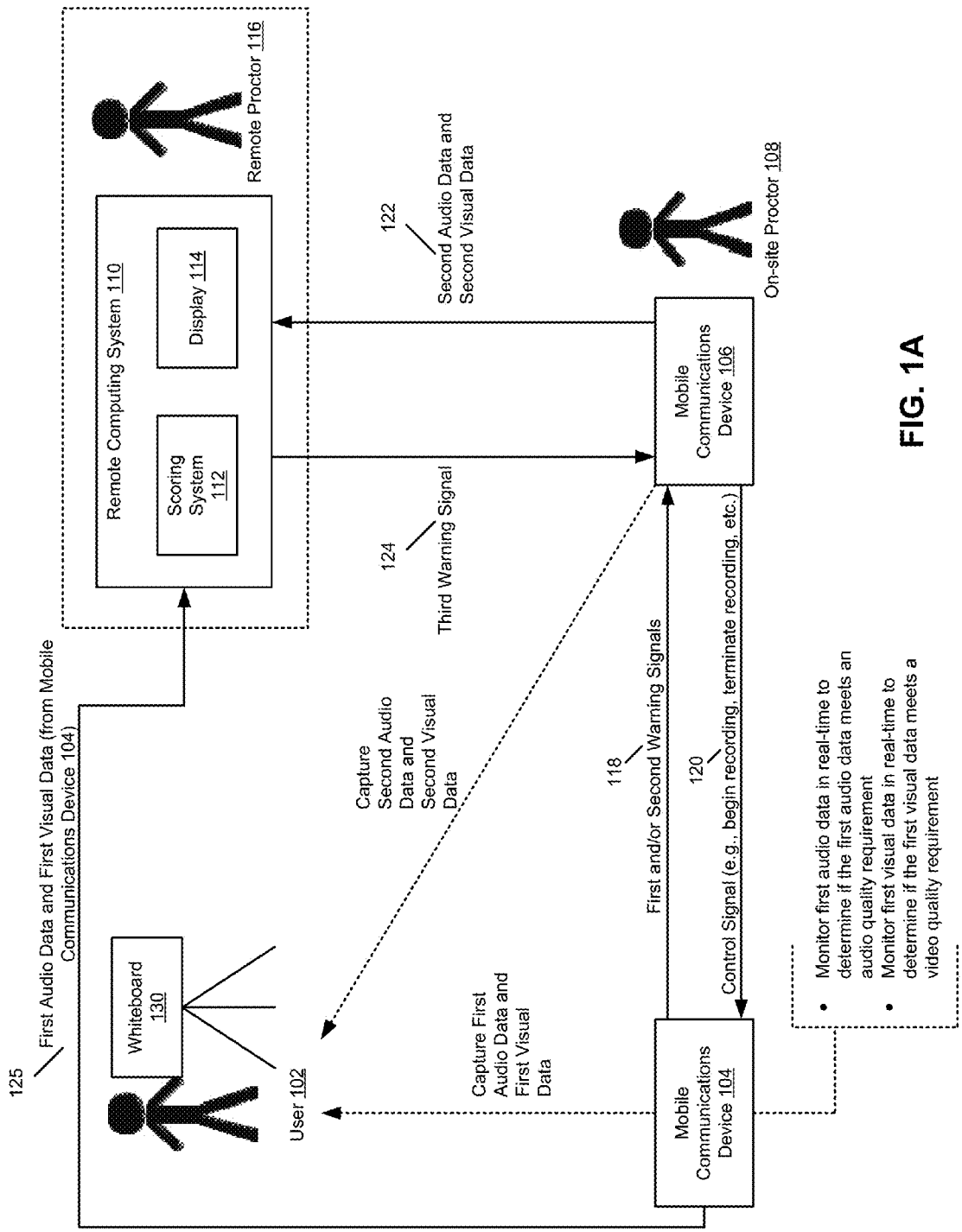
FIG. 1A is a block diagram illustrating an example system for evaluating a user's performance.

FIG. 1A is a block diagram illustrating an example system for evaluating a user's performance according to the present disclosure. In an example, a user 102 is required to complete a performance-based task as part of an assessment. For example, in order to be licensed to practice as a teacher, the user 102 may participate in an assessment that requires the user 102 to complete a simulated teaching performance. The simulated teaching performance may be scored based on multiple factors, such as (i) the content of the user's teaching performance (i.e., what the user 102 says during the simulated teaching performance), (ii) the user's delivery in presenting the content (e.g., a volume of the user's voice, a number of words per minute, etc.), and (iii) a behavior of the user 102 during the simulated teaching performance (e.g., gestures used by the user 102, an amount of time the user 102 faced the audience, etc.).

Unlike what is depicted in FIG. 1A, conventional assessments of a person's performance are performed at a designated test center in the presence of human scorers who score performances without the technology or approaches described herein. For example, for conventional assessments, in a given day, multiple test-takers may travel to the designated test center to complete the assessment. One or more human scorers may be present at the designated test center, enabling them to view test-takers' performances in-person and assign scores to the performances. The performances may or may not be recorded at the test center. The conventional approaches to scoring a performance-based assessment have deficiencies. For example, requiring the test-takers and scorers to travel to a designated test center may be difficult for some test-takers and scorers. Further, numerous costs may be incurred in the conventional approaches. These costs may include, for example: (i) a cost of scheduling multiple test-takers and human scorers to come to the designated test center on a particular day, (ii) costs associated with a purchase or rental of the designated test center or equipment therein, (iii) costs associated with test-takers and human scorers traveling to the designated test center, and (iv) costs associated with a purchase or rental of conventional recording equipment to record the test-takers' performances (e.g., including dedicated video cameras, lighting apparatuses, microphones, etc.). Additionally, the delivery of such performance-based assessments may not be feasible at existing test centers. For example, existing test centers may lack adequate recording equipment. If test-takers' performances cannot be recorded adequately, issues may arise when test-takers feel that their scores are not representative of the quality of their performances.

The approaches described herein may eliminate or mitigate one or more of these issues. Specifically, the systems and methods described herein enable a user's performance to be recorded and evaluated using one or more mobile communications devices (e.g., smartphones, tablet computers, etc.) and without a need for a human scorer to be physically present at a location of the user's performance. The one or more mobile communications devices may execute applications (e.g., mobile applications or "apps") that enable test-taking on any supported device and at a time and place of the test-taker's choice. The use of such devices and applications may reduce costs associated with the assessment (e.g., costs associated with scheduling multiple test-takers and human scorers to come to a designated test center on a particular day, costs associated with test-takers and human scorers traveling to designated test centers, etc.). The use of mobile communications devices, as opposed to dedicated recording equipment, may further reduce costs associated with the assessment. Additionally, in an example, the approaches described herein utilize a computer-based scoring system to evaluate test-takers' performances in an automated manner and without human intervention (or requiring only minimal human intervention), which may further reduce costs associated with the assessment.

The approaches described herein may also address security issues that arise when a human scorer is not physically present at the user's performance. For example, there may be a need to ensure that the user is not receiving unauthorized assistance or utilizing unauthorized materials during the performance. The approaches described herein may address this security issue by having a mobile communications device analyze audio data and/or visual data associated with the user's performance to determine whether the user is receiving the unauthorized assistance or utilizing the unauthorized materials, in an embodiment. In another example, the approaches described herein may address this security issue by transmitting audio and visual data of the performance to a remote computing system in real time. The audio and visual data may be analyzed at the remote computing system to determine whether the user is receiving the unauthorized assistance or utilizing the unauthorized materials, in an embodiment.

The approaches described herein may also address issues that may cause a recording of a user's performance to be invalid or unable to be scored. For example, if users are able to record audio and visual data of their performances using a mobile communications device, there is a risk that a quality of the recordings may be low. Recordings of low quality may not be scorable (e.g., ambient noise in an audio recording may obscure the user's speech, such that the recording may not be scorable, etc.). Issues with the quality of the recordings may concern, for example, a noise level in audio data and lighting problems in visual data, among other issues. The approaches described herein may address these issues by having a mobile communications device analyze audio and visual data associated with the user's performance to determine whether the recorded data meets predetermined quality requirements, in an embodiment. Other approaches for ensuring that a user's performance is scorable are described below.

To illustrate aspects of an example system for evaluating a user's performance, reference is made to FIG. 1A. In FIG. 1A, a user 102 may complete a performance as part of an assessment. The assessment may require the user 102 to complete a simulated teaching performance, for example. The assessment may thus require the user 102 to provide a "performance response" (e.g., a performance response that is recorded via video) to one or more tasks and may differ from conventional assessments, which generally require the user 102 to answer multiple choice questions or essay questions. A first mobile communications device 104 captures first audio data and first visual data (e.g., video or still photographs) of the user's performance, in an embodiment. In an example, the first mobile communications device 104 is a smartphone or a tablet computer executing an application (e.g., an "app") that enables the generation of an audiovisual recording of the performance.

The first mobile communications device 104 may be configured to analyze the first audio data during the user's performance to determine if the first audio data meets an audio quality requirement. In an example, the determination of whether the first audio data meets the audio quality requirement includes (i) comparing a noise level in the first audio data to a threshold noise level, and (ii) comparing a volume of a spoken utterance included in the first audio data to a threshold volume level. The first mobile communications device 104 may also be configured to analyze the first visual data during the user's performance to determine if the first visual data meets a video quality requirement. In an example, the determination of whether the first visual data meets the video quality requirement includes (i) determining if a lighting condition in the first visual data meets a predetermined lighting requirement, and (ii) determining if the user's face, as captured in the first visual data, has a contrast that meets a predetermined facial-contrast requirement.

The first mobile communications device 104 may be configured to analyze the first audio and visual data in real-time or near real-time, i.e., during the user's performance and as the audio and visual data are being captured. Based on a determination that the first audio data does not meet the audio quality requirement, the first mobile communications device 104 may generate a first signal (e.g., a first "warning signal"). Similarly, based on a determination that the first visual data does not meet the video quality requirement, the first mobile communications device 104 may generate a second signal (e.g., a second "warning signal"). As described in further detail below, the generation of the first or second signals may cause the recording of the performance to be paused or terminated. After the recording is paused or terminated, adjustments may be made to address the problem (e.g., a lighting problem may be mitigated by changing the lighting in the testing environment, etc.), and the recording may be re-started. By analyzing the first audio and visual data in real-time or near real-time and enabling such adjustments to be made, there is a reduced possibility that a recording of the user's performance will be unable to be scored.

The system of FIG. 1A also includes a second mobile communications device 106. Like the first mobile communications device 104, the second mobile communications device 106 may be configured to capture audio data and visual data associated with the user's performance. Such audio and visual data captured by the second mobile communications device 106 is referred to herein as "second audio data" and "second visual data," respectively. The second visual data may capture a different field of view than the first visual data, in an example. To capture the different field of view, the second mobile communications device 106 may be placed in a different location than the first mobile communications device 104, or the second mobile communications device 106 may utilize a component (e.g., a wide-angle lens) that enables the different field of view. In an example, instead of using a second mobile communications device 106, a different field of view could be captured at a different time during the performance with the first mobile communications device moved to a different location to provide the different field of view.

In an example, the field of view captured in the second visual data is larger than that of the first visual data. The field of view captured in the second visual data may thus capture a larger amount of an environment in which the user's performance occurs as compared to the first visual data. Thus, in an example, the first visual data captured by the first mobile communications device 104 captures a more limited field of field (e.g., including portions of a body of the user 102 and a whiteboard 130 used in the performance) and the second visual data captured by the second mobile communications device 106 captures a "security view" of the testing environment (e.g., including a wide-angle view that encompasses the user 102, the whiteboard 130, and more of an environment in which the assessment is occurring). The expanded field of view of the security view may be analyzed to determine if the user 102 is receiving unauthorized assistance or utilizing unauthorized material in the performance, as described below.

The second mobile communications device 106 is configured to transmit the second audio and visual data 122 to a remote computing system 110. The second audio and visual data 122 may be analyzed at the remote computing system 110 to determine if the user 102 is receiving unauthorized assistance or utilizing unauthorized material in the performance. In an example, the analysis of the second audio and visual data 122 is performed by the remote computing system 122 in an automated manner, and without human intervention or requiring only minimal human intervention. In another example, the analysis of the second audio and visual data 122 is performed by a human proctor 116 at the remote computing system 110. The human proctor 116 may be referred to herein as a "remote proctor," because he or she is not physically present at a location of the user's performance. The human proctor 116 may view video of the user's performance via a display 114 of the remote computing system 110.

In an example, the second mobile communications device 106 transmits the second audio and visual data 122 to the remote computing system 110 in real-time or near real-time and during the user's performance. In another example, the second mobile communications device 106 transmits the second audio and visual data 122 to the remote computing system 110 at a completion of the user's performance. If it is determined that the user 102 is receiving unauthorized assistance or utilizing unauthorized material, the remote computing system 110 may generate a third signal 124 (e.g., a third "warning signal"). The third signal 124 may be transmitted from the remote computing system 110 to the second mobile communications device 106, if present. The second mobile communications device 106 may also receive the first and second signals 118 from the first mobile communications device 104, if present.

Based on its receipt of the first, second, or third warning signals, the second mobile communications device 106 may make a determination as to whether the capturing of the audio and visual data by the first and second mobile communications devices 104, 106 should be paused or terminated. In an example, the second mobile communications device 106 may receive a first signal from the first mobile communications device 104 indicating that a volume of the user's voice in the first audio data was below a threshold volume level for a short amount of time. Based on this first signal, the second mobile communications device 106 may determine that recording should not be paused or terminated (e.g., the second mobile communications device 106 may determine that the volume problem was minor and that recording should continue unabated).

In another example, the second mobile communications device 106 may receive a second signal from the first mobile communications device 104 indicating that the first visual data failed to meet a predefined lighting requirement for an extended period of time (e.g., 1 minute). Based on this second signal, the second mobile communications device 106 may determine that recording should be paused or terminated (e.g., the second mobile communications device 106 may determine that the lighting problem is serious and that recording should be paused in order to fix the problem). In another example, the second mobile communications device 106 may receive a third signal from the remote computing system 110 indicating that the user 102 is receiving unauthorized assistance or utilizing unauthorized material in the performance. Based on this third signal, the second mobile communications device 106 may determine that recording should be terminated.

If the second mobile communications device 106 determines that the capturing of the audio and visual data by the first and second mobile communications devices 104, 106 should be paused or terminated, a control signal 120 may be transmitted from the second mobile communications device 106 to the first mobile communications device 104. Receipt of the control signal 120 at the first mobile communications device 104 may cause the capturing of the first audio and visual data to be paused or terminated. As described in further detail below, the control signal 120 may be used to control the first mobile communications device 104 in other ways. For example, receipt of the control signal 120 at the first mobile communications device 104 may be used to trigger capturing of the first audio and visual data at the first mobile communications device 104.

To determine a score for the user's performance, the first audio and visual data 125 is transmitted from the first mobile communications device 104 to the remote computing system 110. In an example, the remote computing system 110 includes a computer-based scoring system 112 that is configured to determine the score. The computer-based scoring system 112 may determine the score based on a plurality of numerical measures (e.g., features) that are determined by processing the first audio and visual data 125 with a processing system, with the score being determined automatically and without human intervention (or requiring only minimal human intervention). The computer-based scoring system 112 may be included as part of the first or second mobile communications devices 104, 106, in an embodiment. In this embodiment, the automated scoring may be performed on the first or second mobile communications devices 104, 106 and without uploading the first audio and visual data 125 to the remote computing system 110. In another example, a human (e.g., the remote proctor 116) listens to the first audio data, views the first visual data, and determines the score for the user's performance based on such audio and visual data.

Each of the first and second mobile communications devices 104, 106 are able to record high definition ("HD") audio and video, in an embodiment. Additionally, both devices 104, 106 are able to access the Internet (e.g., via a wireless connection or a wired connection) and may be able to communicate with each other via one or more wireless connectivity standards (e.g., Bluetooth, WiFi, etc.). The devices' abilities to access the Internet may allow them to upload the audio and visual data 122, 125 to the remote computing system 110 and to receive signals, commands, instructions, or data from other components of the example system.

In an example, the devices 104, 106 each have adequate processing speed and power to enable real-time or near real-time monitoring and analysis of audio and video data. As noted above, the first mobile communications device 104 may be configured to (i) analyze the first audio data in real-time or near real-time (i.e., as the performance is being recorded and during the user's performance) to determine if the first audio data meets an audio quality requirement, and (ii) analyze the first visual data in real-time or near real-time to determine if the first visual data meets a video quality requirement. The second mobile communications device 106 may be able to perform similar real-time or near real-time monitoring and analysis of audio and visual data.

As described in further detail below, the example system of FIG. 1A uses a combination of hardware (e.g., hardware of the mobile communications devices 104, 106 and remote computing system 110) and software (e.g., applications that are executed on the hardware devices) to enable the scoring of the user's performance. In an example, a first app is executed on the mobile communications device 104, and a second app is executed on the mobile communications device 106. The first app is described herein as a "test-taker app," and the second app is described herein as a "proctor app." The test-taker app, executed on the first mobile communications device 104, may be referred to as such because the first mobile communications device 104 may be operated by the user 102, where the user 102 is a test-taker seeking to have his or her performance evaluated. The proctor app, executed on the second mobile communications device 106, may be referred to as such because the second mobile communications device 106 may be operated by the human proctor 108. The human proctor 108 is referred to herein as an "on-site proctor," because the human proctor 108 may be physically present at the location of the assessment to proctor the assessment in-person. In an example, the on-site proctor 108 is a person that has received no training or minimal training in administering an examination. In this example, despite the on-site proctor's lack of training in test administration, the on-site proctor may be able to proctor the examination based on (i) instructions provided by the proctor app, and/or (ii) instructions provided by the remote computing system 110, which may be delivered via the proctor app. The instructions provided by the remote computing system 110 may be instructions generated by the remote proctor 116, who may be a trained test administrator. The delivery of such instructions is described in further detail below.

In an example, the user 102 downloads and installs the test-taker app on the first mobile communications device 104. Upon installation, the app may confirm that the first mobile communications device 104 meets a set of minimum technical requirements (e.g., Internet connectivity, HD video and audio recording capabilities, adequate processing speed and power to handle real-time monitoring of recording quality, etc.). The test-taker app may further enable the user 102 to register for a performance-based assessment and designate a time and location for the assessment. In an example, the user 102 can designate nearly any location for the assessment, thus preventing the user 102 from having to travel a long distance to a testing center. The proctor 108 may similarly download and install the proctor app on the second mobile communications device 106. Upon installation, the proctor app may confirm that the device 106 meets a set of minimum technical requirements.

The systems and methods described herein may accommodate multiple testing scenarios. For example, in a first scenario, a test center may provide the first and second mobile communications devices 104, 106, and the provided devices 104, 106 may have the respective test-taker and proctor apps pre-installed prior to the assessment. In a second scenario, the user 102 and the on-site proctor 108 may use their own personal devices in recording the performance (e.g., the user's personal device is the first mobile communications device 104, and the on-site proctor's personal device is the second mobile communications device 106). In the second scenario, the assessment may take place outside of a conventional test center (e.g., the assessment may take place nearly anywhere, at a location of the user's choosing). In either scenario, the user 102 may download and install an app (e.g., a test-taker app) to his or her personal device. The installation of this app may allow the user 102 to register for an assessment and receive relevant information (e.g., test instructions, test preparation materials, etc.). In the first scenario, the user's personal device is not used in recording his or her performance, and instead, the personal device may be used only for the registering and the receiving of the relevant information. In the second scenario, the user's personal device may be used in recording his or her performance, registering for the assessment, and receiving the relevant information.

At the designated time for the assessment, the test-taker app may verify that the device 104 is at the designated testing location using a GPS functionality of the device 104. The use of the GPS functionality for this purpose is described in further detail below. The test-taker app may further check that an identity of the user 102 matches an expected identity of the test-taker that is registered to complete the performance-based assessment. The proctor app executed on the second mobile communications device 106 may similarly verify that the device 106 is at the designated testing location using a GPS functionality of the device 106. The proctor app may also check that an identity of the proctor 108 matches an expected identity of the proctor that is scheduled to proctor the performance-based assessment. Prior to starting the assessment at the designated testing location, both the test-taker app and the proctor app may perform a check to ensure that their respective devices 104, 106 have adequate network connectivity.

At the designated testing location, the test-taker app may provide instructions to guide the user 102 and the proctor 108 in setting up the recording. Such instructions may be interactive instructions for determining a placement of the mobile communications devices 104, 106 with respect to the user 102 and other items in the testing environment (e.g., the whiteboard 130). The instructions may also guide the user 102 and the proctor 108 in establishing adequate lighting of the testing environment and ensuring that spoken utterances by the user 102 are of adequate volume in the recorded audio data, for example.

When the first and second mobile communications devices 104, 106 are properly setup, and the testing environment is determined to be adequate, the test-taker app may deliver a task to the user 102. The task may be delivered to the user 102 visually (e.g., via on-screen instructions) or via audio instructions, for example. In an example, the task requires the user 102 to complete a simulated teaching performance. The task may specify that the user 102 has a certain amount of time to prepare to perform the task, and the test-taker app or proctor app may display a countdown timer that indicates an amount of preparation time remaining. During the preparation period, the proctor app may record the user's performance on the second mobile communications device 106. After the preparation time ends, the test-taker app may begin recording the user's performance on the first mobile communications device 104. The proctor app also records the user's performance on the second mobile communications device 106. The recording of the performance and related operations performed by the devices 104, 106 (e.g., monitoring the recording quality in real-time and transmitting audio and visual data to the remote computing system 110) are described above.

When the user's performance has ended, the test-taker app and the proctor app may stop the recording on the first and second mobile communications devices 104, 106, respectively. Using the proctor app, the proctor 108 may confirm the authenticity of the performance (e.g., confirm that the user 102 did not receive unauthorized assistance or utilize unauthorized material in the performance). The first mobile communications device 104 uploads the first audio and visual data 125 to the remote computing system 110, and the second mobile communications device 106 uploads the second audio and visual data 122 to the remote computing system 110. The remote computing system 110 may respond to the devices 104, 106 with an acknowledgment that the data was received.

Figure 1B:
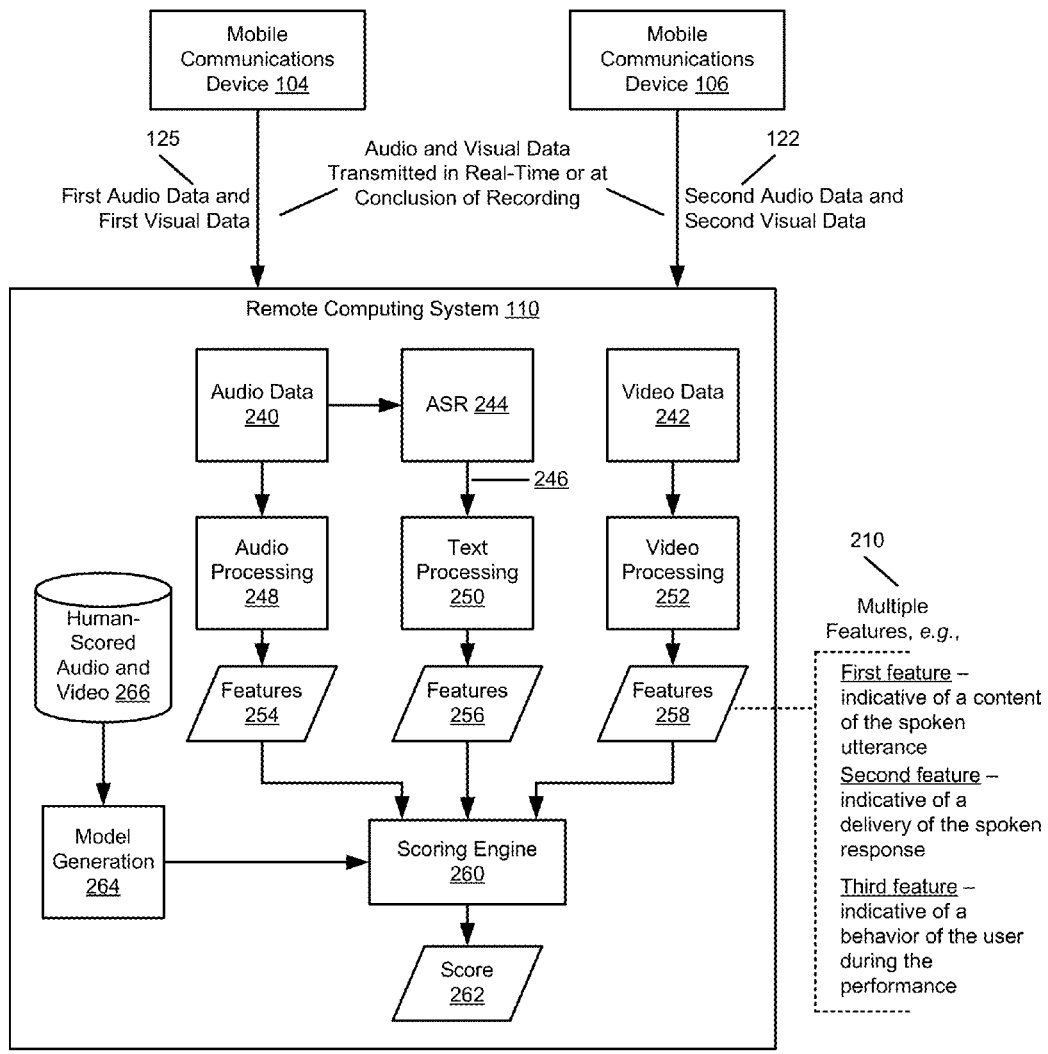
FIG. 1B depicts additional details of the remote computing system of FIG. 1A, in an embodiment of the disclosure.

FIG. 1B depicts additional details of the remote computing system 110 of FIG. 1A, in an embodiment of the disclosure. As described above, the remote computing system 110 may be configured to determine a score for the user's performance in an automated manner (e.g., without human intervention or requiring only minimal human intervention). To accomplish this, the remote computing system receives audio and visual data 122, 125 from the mobile communications devices 104, 106. Audio data 240 (e.g., comprising one or both of the first audio data captured by the device 104 and the second audio data captured by the device 106) is received at an automatic speech recognition (ASR) module 244 of the remote computing system 110, in an embodiment. The ASR module 244 may perform an automated speech recognition function, yielding a text 246 (e.g., a transcript) that is representative of spoken utterances included in the user's performance. The text 246 that is generated by the ASR module 244 may be accompanied by one or more confidence scores, each indicating a reliability of a recognition decision made by the ASR module 244. For example, a confidence score may be computed for recognized words of the spoken utterances to indicate how likely it is that a word was correctly recognized.

The text 246 generated by the ASR module 244 is received at a text processing module 250 of the remote computing system 110, in an embodiment. Text processing performed on the text 246 at the text processing module 250 may include parsing the text 246 with a processing system to generate a set of individual words included in the text 246. The text processing performed on the text 246 at the text processing module 250 may further include processing the text 246 to remove disfluencies from the text 246. In an example, the disfluencies that may be removed from the text 246 include filled pauses, filler words (e.g., "um" and "uh"), recognized partial words, and repeated words, among others. The parsing and removal of disfluencies from the text 246 may be carried out using conventional automated, computer-based algorithms known to those of ordinary skill in the art.

Various other text processing and analysis may be performed on the text 246 at the text processing module 250.

The text processing and analysis performed at the text processing module 250 are used to extract one or more features 256 from the text 246. In an example, the one or more features 256 include numerical measures or Boolean values that are representative of aspects of the spoken utterances of the user's performance.

The audio data 240, which is received at the ASR module 244, as described above, is also received at an audio processing module 248. The audio processing module 248 is configured to process and analyze the audio data 240. Audio processing performed on the audio data 240 at the module 248 may include extracting audio data associated with the user's spoken utterances and performing prosody analysis of the extracted data using the processing system. The processing and analysis of the audio data 240 may be carried out using conventional automated, computer-based algorithms known to those of ordinary skill in the art. Various other audio processing and analysis may be performed on the audio data 240 at the audio processing module 248. The audio processing and analysis performed at the audio processing module 248 are used to extract one or more features 254 from the audio data 240.

Video data 242 (e.g., comprising one or both of the first visual data captured by the device 104 and the second visual data captured by the device 106) is received at a video processing module 252. The video processing module 252 is configured to process and analyze the video data 242. Video processing performed on the video data 242 at the module 252 may include video-based facial feature tracking, video-based head-tracking, video-based estimation of locomotion and body/head orientation, and video-based gesture recognition that is performed using the processing system. The processing and analysis of the video data 242 may be carried out using conventional automated, computer-based algorithms known to those of ordinary skill in the art. Various other video processing and analysis may be performed on the video data 242 at the video processing module 252. The video processing and analysis performed at the video processing module 252 are used to extract one or more features 258 from the video data 242.

The features 254, 256, 258 extracted from the audio data 240, text 246, and video data 242, respectively, may include example features 210 illustrated in FIG. 1B. As shown in this figure, a first example feature of the example features 210 may be indicative of a content of spoken utterances included in the user's performance (e.g., based on the transcript 246, presence of keywords or concepts in the spoken utterances, etc.). A second example feature of the example features 210 may be indicative of the user's delivery of the spoken utterances (e.g., prosody of the user's speech, a volume of the user's voice, a number of words per minute, intonation variation in the user's voice, presence of disfluencies, etc.). A third example feature of the example features 210 may be indicative of a behavior of the user 102 during the performance (e.g., facial features used by the candidate, movement of the candidate during the performance, body/head orientation of the candidate, gestures used by the user 102, an amount of time the user 102 faced the audience, etc.).

The extracted features 254, 256, 258, including the example features 210, are received at a scoring engine 260. The scoring engine 260 includes an automated scoring system configured to determine a score 262 for the user's performance. The score 262 may be intended to reflect various aspects of the user's performance such as (i) the content of the user's teaching performance, (ii) the user's delivery in presenting the content, and (iii) a behavior of the user during the simulated teaching performance. The score 262 may be a point score (e.g., 87 points out of 110 points possible), a percentage or decimal score, a classification (e.g., "high," "medium," "low," etc.), or a ranking, for example. In an example, the scoring engine 260 is a computer-based system for automatically scoring the user's performance that requires no human intervention or minimal human intervention. The scoring engine 260 may determine the score 262 for the user's performance based on the extracted features 254, 256, 258 and a scoring model. The scoring model may include weighting factors for the extracted features 254, 256, 258, and the weighting factors may be determined based on a plurality of human-scored audio and video 266. The scoring model may also be referred to as a "scoring equation."

The scoring model may be a numerical model that is applied to the extracted features 254, 256, 258 to determine the score 262. In an example, where the first, second, and third features 210 are extracted from the user's performance, the scoring model includes a first variable and an associated first weighting factor, a second variable and an associated second weighting factor, and a third variable and an associated third weighting factor. The first variable receives a value of the first feature, the second variable receives a value of the second feature, and the third variable receives a value of the third feature. By applying the scoring model to the first, second, and third features in this manner, the score 262 for the user's performance is determined.

To generate the scoring model used in the scoring engine 260, a model generation module 264 may be used. The model generation module 264 receives the human-scored audio and video 266 with associated scores and uses the human-scored audio and video 266 to determine the weighting factors for the model, e.g., through a regression analysis. The human-scored audio and video 266 may span a range of reference scores reflecting varying degrees of performance quality. In an example, the weighting factors of the model are determined via a machine learning application trained based on the human-scored audio and video 266. Specifically, the machine learning application may be a linear regression classifier or another suitable machine learning application. As illustrated in FIG. 1B, the model generation module 264 provides the model to the scoring engine 260.

With the scoring model in place, the user's performance may be scored by applying the scoring model as noted above. It should be appreciated that under the approaches described herein, one or more computer-based models may be used in determining the score 262 for the user's performance. As described above, such computer-based models may be trained via a machine-learning application (e.g., a linear regression classifier, etc.) in order to determine weighting factors for the models. The computerized approaches for scoring a user's or candidate's performance described herein, which utilize, e.g., various computer models trained according to sample data, are very different from conventional human scoring of a user's or candidate's performance. In conventional human scoring of a candidate performance, a human grader observes the performance and makes a holistic, mental judgment about its proficiency and assigns a score. Conventional human grading of such performance does not involve the use of the computer models, associated variables, training of the models based on sample data to calculate weights of various features or variables, transforming observed data based on such models, representing such processed data with suitable data structures, and applying the computer models to such data structures to score the performance, as described herein. Moreover, conventional human scoring may suffer from inconsistency in scoring from one human scorer to another, and/or may suffer from inconsistency in scoring even with the same human scorer from one day to the next. The approaches described herein may not suffer from such deficiencies.

Figure 1C:
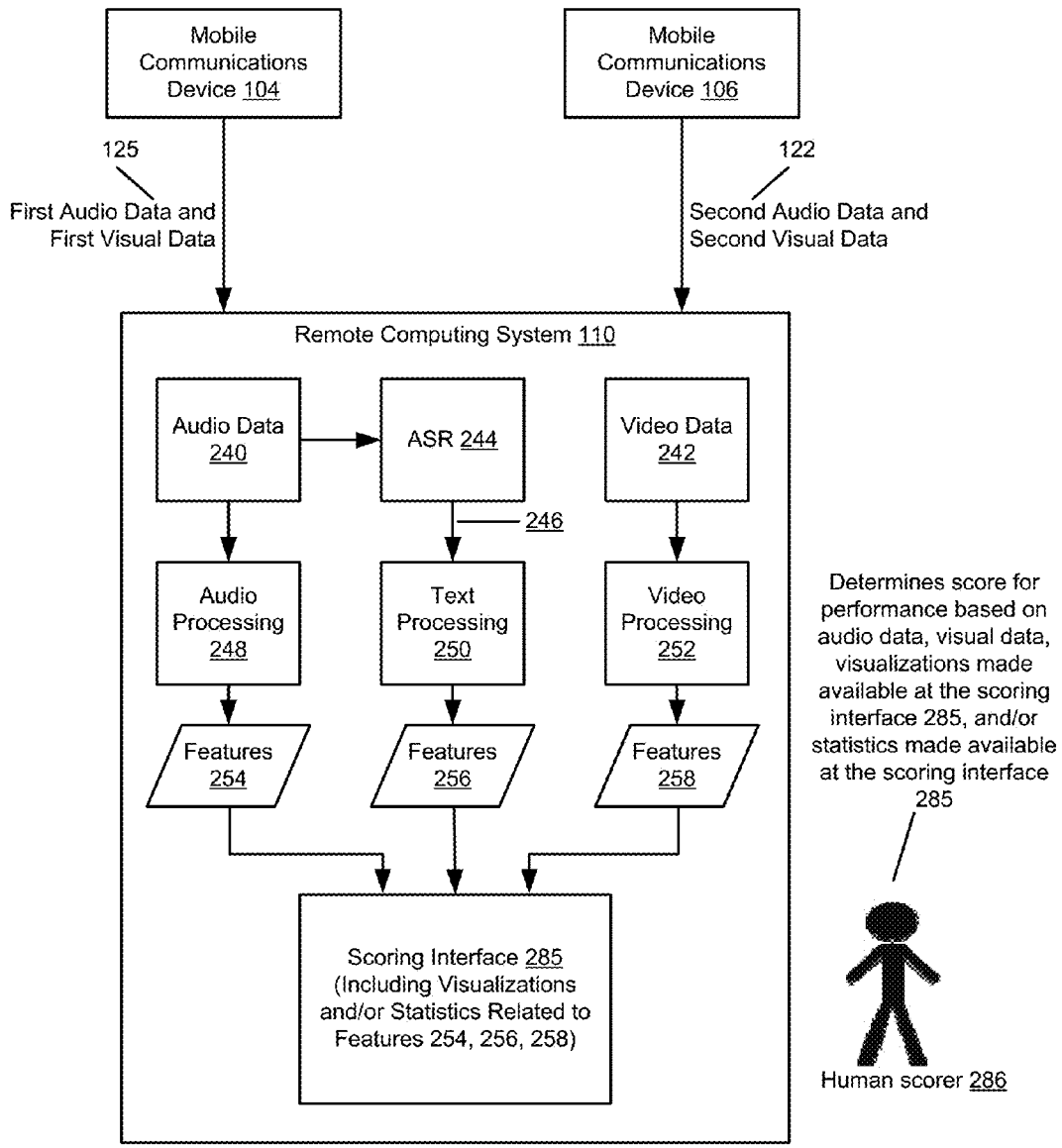
FIG. 1C depicts additional details of the remote computing system of FIG. 1A, in another embodiment of the disclosure.

FIG. 1C depicts additional details of the remote computing system 110 of FIG. 1A, in another embodiment of the disclosure. As described above, a human (e.g., the remote proctor 116) may determine the score for the user's performance based on audio and visual data received at the remote computing system 110, in an embodiment. Thus, in an example, the audio and visual data collected by the first mobile communications device 104 and the second mobile communications device 106 may be made available at a scoring interface 285 of the remote computing system 110. A human scorer 286 may access the audio and visual data via the scoring interface 285 and determine a score for the user's performance based on such data. In an example, human scoring is accomplished via a crowd-sourcing technique.

In an example, the remote computing system 110 implements a computer-assisted scoring system. Certain features of the user's performance (e.g., an amount of time the user faces the audience, the user's voice variation and quality, and/or the type and frequency of certain gestures utilized by the user) may be reliably captured and quantified using current computer-based multimodal technologies. Thus, in addition to the audio and video of the performance that are accessible to the human scorer 286 via the scoring interface 285, the scoring interface 285 may also present to the human scorer 286 visualizations or statistics (synchronized with the audio and video data) relating to (i) face orientation, locomotion, and gestures over time; (ii) a transcript (e.g., a transcript generated by the ASR module 244) or predetermined keywords included in the user's spoken utterances; (iii) voice quality analyses, relating to loudness, intonation variation, and disfluencies; and (iv) a high resolution image (e.g., composite across video frames) of the content of the whiteboard 130, among other visualizations or statistics.

The human scorer 286 may use these visualizations or statistics to assist their scoring. In an example, the visualizations or statistics are generated based on the extracted features 254, 256, 258 described above with reference to FIG. 1B or other features that are extracted by the audio processing module 248, text processing module 250, and video processing module 252. In an example, a score for the user's performance may be determined based on a combination of the score 262 generated by the automated scoring engine 260 of FIG. 1B and a score determined by the human scorer 286. For example, the human scorer 286 may focus on various subjective features in determining his or her score for the user's performance, while the automated scoring engine 260 of FIG. 1B may be used to generate a score based on objective aspects of the performance.

Figure 2:
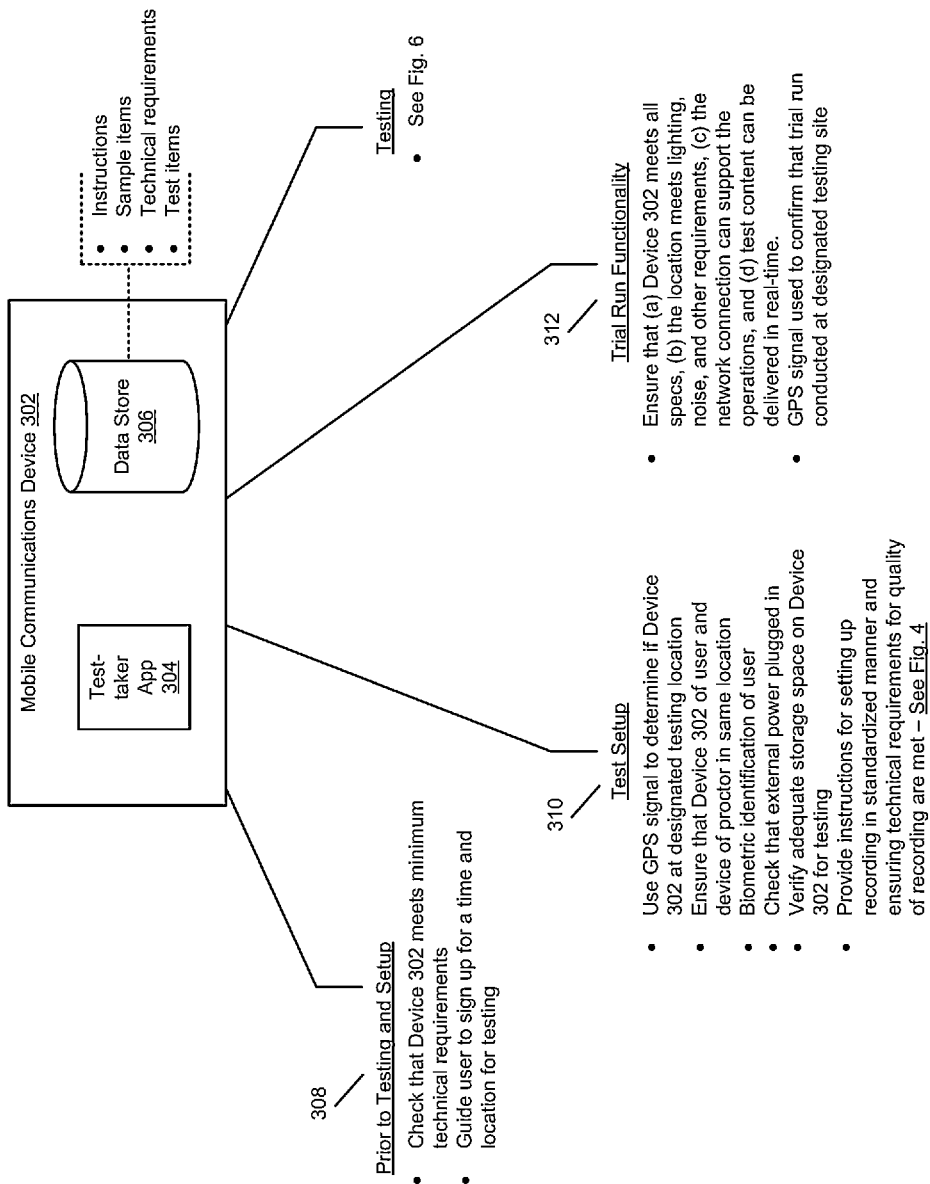
FIG. 2 illustrates example features of a mobile communications device that executes an app used in a system for evaluating a user's performance.

FIG. 2 illustrates example features of a mobile communications device 302 that executes an app 304 used in a system for evaluating a user's performance. In the example of FIG. 2, the app 304 may be the "test-taker app" described above with reference to FIG. 1A. In an example, the user (e.g., the user 102 of FIG. 1A) downloads and installs the app 304 onto the mobile communications device 302. As illustrated at 308, prior to testing and prior to a test-setup procedure, the test-taker app 304 may perform a check to determine if the device 302 meets a set of minimum technical requirements (e.g., Internet connectivity, HD video and audio recording capabilities, adequate processing speed and power to handle real-time monitoring of recording quality, etc.). The app 304 may further enable the user to sign up for an assessment by designating a time and location for testing.

The downloading and installation of the test-taker app 304 may cause various data to be stored on a data store 306 of the device 302. The data store 306 may be a volatile or non-volatile memory or another type of storage. The data stored on the data store 306 may include, for example, instructions for setting up a recording of a performance, sample items, practice items, technical requirements, and test items. In other examples, test items (e.g., actual testing tasks) are not stored in the data store 306 upon installation of the app 304, and instead, such test items are received from a remote server just before the testing is scheduled to begin. This may be done for security reasons (e.g., to ensure that the test-taker does not access the test items in advance of the test). In instances where test items are stored in the data store 306, the test items may be stored in encrypted form for security reasons.

As illustrated at 312 in FIG. 2, the app 304 enables the test-taker to complete "trial runs." As referred to herein, a trial run is a simulation of an actual assessment, as carried out using the systems and methods described herein and utilizing one or more mobile communications devices. In a trial run, the app 304 may ensure that (i) the device 302 meets all technical specifications, required to complete the assessment (e.g., adequate storage space for the recorded video, adequate processor speed to analyze the recorded video in real-time, etc.), (ii) the location of the trial run meets lighting, noise, and other requirements, (iii) a network connection utilized by the device 302 at the location can support testing operations (e.g., the network connection can support the downloading of test items to the device 302 and the uploading of audio and video data from the device 302 to a remote computing system, etc.), and (iv) test content can be delivered to the device 302 in real-time.

In an example, the trial run is completed at the designated location at which the user's assessment is scheduled to occur. To verify that the user performs the trial run at the designated location, the app 304 may cause the device 302 to (i) receive a GPS signal from a satellite, (ii) determine a location of the device 302 based on the GPS signal, and (iii) determine if the location of the device 302 matches a designated location at which the user's performance is required to occur. In an example, the test-taker is required to perform a trial run prior to starting an actual assessment. In this example, until and unless the trial run is completed (including the performance of the technical checks described above), the actual assessment will not be delivered to the device 302.

As described above with reference to FIG. 1A, the approaches described herein may utilize a second mobile communications device as part of the system for evaluating a user's performance. The second mobile communications device may be operated by an on-site test proctor, in an example. FIG. 3 illustrates example features of such a second mobile communications device. In this figure, a mobile communications device 352 executes an app 354. The app 354 may be the "proctor app" described above with reference to FIG. 1A. In an example, a person seeking to proctor performance-based assessments downloads and installs the app 354 onto the mobile communications device 352. The person seeking to proctor the assessments may be a pre-qualified proctor that has been authorized to proctor performance-based assessments, in an embodiment. The downloading and installation of the proctor app 354 may cause various data to be stored on a data store 356 of the device 352. The data store 356 may be a volatile or non-volatile memory or another type of storage. The data stored on the data store 356 may include, for example, instructions for proctoring an assessment, instructions for setting up the mobile communications devices 302, 352 to record the assessment, and various training materials for the proctor (e.g., training materials that explain the duties of the proctor, etc.).

As illustrated at 358, prior to testing and prior to a test-setup procedure, the proctor app 354 may perform a check to verify that the device 352 meets minimum technical requirements (e.g., Internet connectivity, HD video and audio recording capabilities, adequate processing speed and power to handle real-time monitoring of recording quality, etc.). The app 354 may further enable the proctor to receive information on a proctoring appointment and directions for proctoring. In an example, the mobile communications device 352 utilized by the proctor is the Google Glass device or a similar device.

With reference again to FIG. 2, as illustrated at 310, at the designated time of the assessment (e.g., as scheduled by the test-taker using the app 304), the app 304 may cause the device 302 to perform certain "test setup" steps. In the test setup steps, the app 304 may use a GPS signal received by the device 302 to ensure that the device 302 is at the designated testing location (e.g., as set by the test-taker using the app 304). In instances where the device 302 cannot receive the GPS signal (e.g., due to the device 302 being indoors), confirmation that the device 302 is at the designated testing location may be based on a last-known GPS location of the device 302. The proctor app 354 executed on the mobile communications device 352 of FIG. 3 may likewise perform "test setup" steps at the designated time of the assessment. In the test setup steps, the proctor app 354 may use a GPS signal received by the device 352 to ensure that the device 352 is at the designated testing location. In instances where the device 352 cannot receive the GPS signal, confirmation that the device 352 is at the designated testing location may be based on a last-known GPS location of the device 352.

With reference again to FIG. 2, at 310, the test setup steps performed by the test-taker app 304 may further be used to ensure that the mobile communications device 302 (e.g., the device operated by the test-taker) is at a same physical location as the mobile communications device 352 (e.g., the device operated by the on-site proctor). This may be performed, for example, via the test-taker using the mobile communications device 302 to scan a 2D bar code generated on the mobile communications device 352 via the proctor app 354. Alternatively, the devices 302, 352 may be determined to be at the same physical location via an accelerometer signal, e.g., by having the test-taker and the proctor "bump" their respective devices 302, 352.

As part of the test setup steps, the test-taker app 304 may further check that an identity of the test-taker matches an identity of the person that is registered to complete the performance-based assessment. The proctor app 354 executed on the mobile communications device 352 may similarly verify that an identity of the proctor matches an identity of the person that is scheduled to proctor the performance-based assessment. In checking the test-taker and proctor identities, the apps 304, 354 may use facial, voice, and other biometric identifications (e.g., using a fingerprint scanner that is included on the devices 302, 352, etc.). In the test setup steps, the test-taker app 304 may further check to see that the device is connected in to an external power source and verify that the device 302 has adequate storage space for completing the testing procedures (e.g., adequate space to record audio and visual data of the test-taker's performance, etc.).

At the designated location of the assessment, the devices 302, 352 may each be mounted on a respective tripod. The devices 302, 352 may also be connected to external power sources (e.g., AC wall outlets). Additional hardware that may be used with one or both of the devices 302, 352 includes various lenses (e.g., a wide-angle lens to support recording of the "security view" by the proctor's mobile communications device 352), directional microphones to enable higher-fidelity audio recordings and ambient noise reduction, motorized swivel stands for panning one or both of the devices 302, 352, etc.). To guide the test-taker and proctor in determining a placement for the devices 302, 352, the apps 304, 354 may provide instructions. For example, the instructions may state that the device 302 should be placed such that its camera is facing towards a particular item in the testing environment. In an example, the item is a whiteboard.

In an example, the proctor's mobile communications device 352 is placed such that the mobile communications device 352 can record visual data of a "security view" of the testing environment. In an example, the field of view captured by the proctor's mobile communications device 352 is larger than that captured by the test-taker's mobile communications device 302. The field of view captured by the proctor's mobile communications device 352 may thus capture a larger amount of an environment in which the test-taker's performance occurs as compared to the field of view captured by the test-taker's mobile communications device 302. In an example, the first visual data captured by the test-taker's mobile communications device 302 captures a more limited field of field (e.g., including portions of a body of the test-taker and a whiteboard used in the performance) and the second visual data captured by the proctor's mobile communications device 352 captures the security view of the testing environment that may include a wide-angle view that encompasses the test-taker, an item in the testing environment (e.g., a whiteboard), and more of an environment in which the assessment is occurring. A wide angle lens may be used with the proctor's mobile communications device 352 to capture the security view.

As described in further detail below, the audio and visual data captured by the proctor's mobile communications device 352 may be transferred to a remote computing system in real-time or near real-time to enable remote proctoring of the performance-based assessment. Instructions may be transmitted from the remote computing system to the proctor's mobile communications device 352. Such instructions may require that the on-site proctor pause or terminate the recording or change a position of the mobile communications device 352 in order to record different portions of the environment in which the assessment is occurring. Should the on-site proctor fail to follow the instructions, the assessment may be deemed invalid.

Figure 4A:
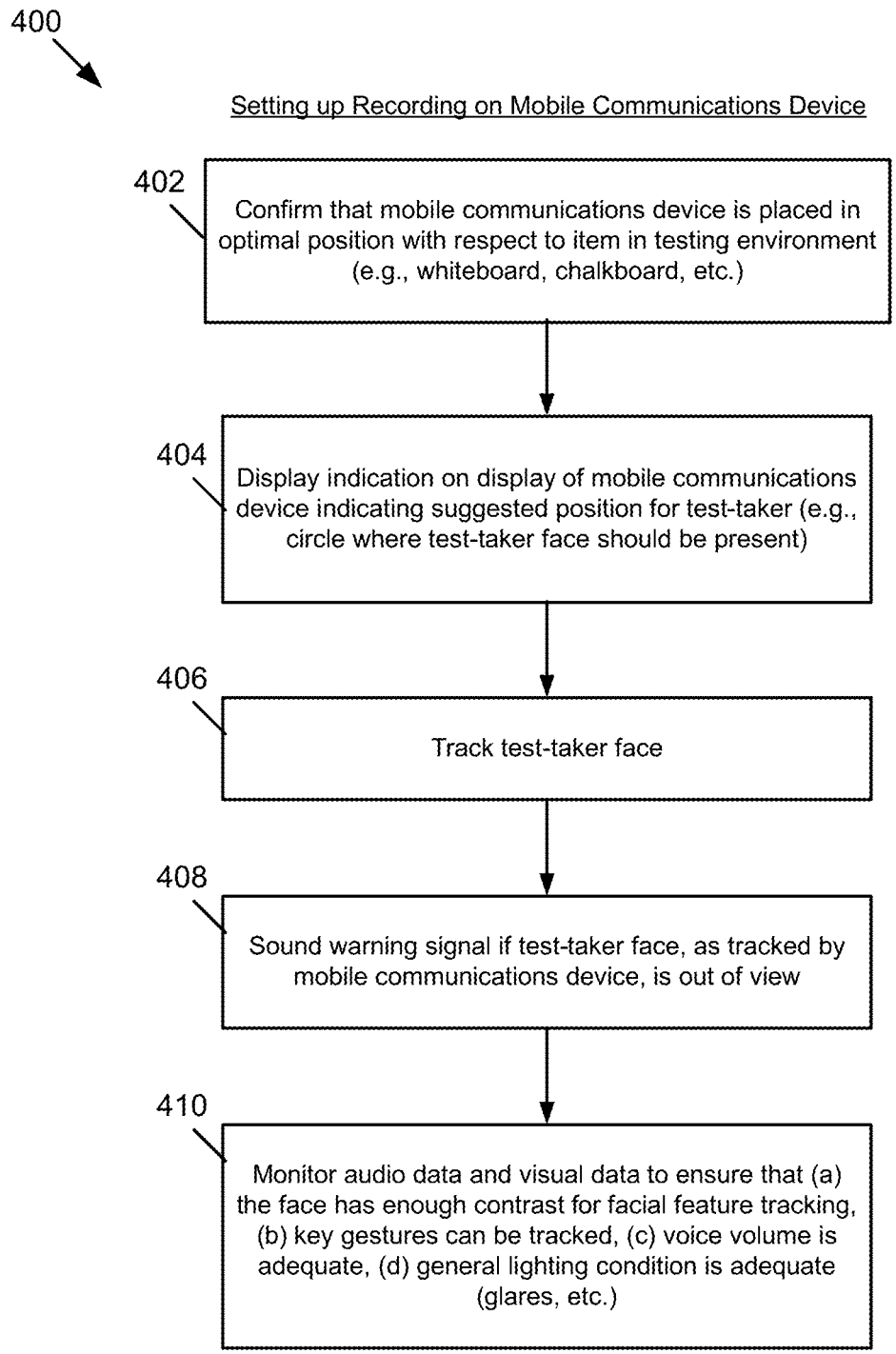
FIG. 4A is a flowchart illustrating example steps performed by a mobile communications device in setting up a recording of a test-taker performance.
Figure 4C:
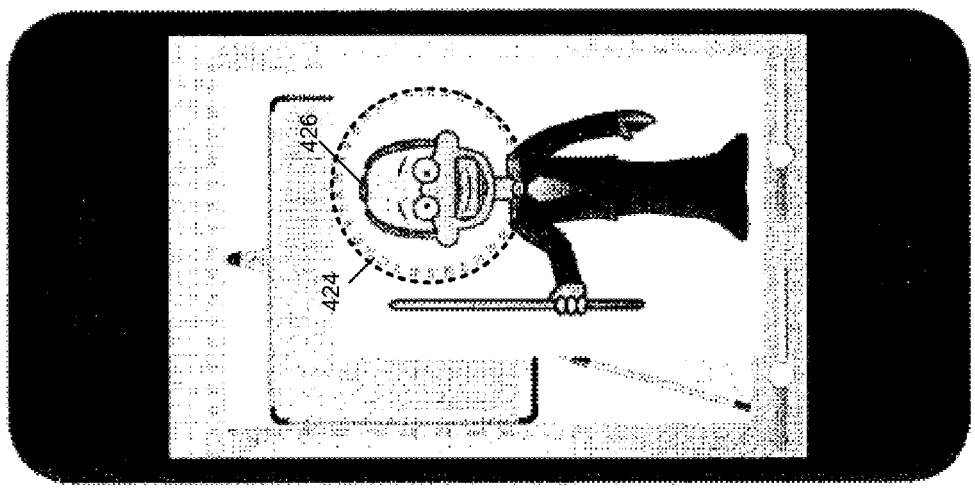
FIG. 4C depicts a mobile communications device displaying a suggested standing location for a test-taker on a display element of the device.
Figure 4B:
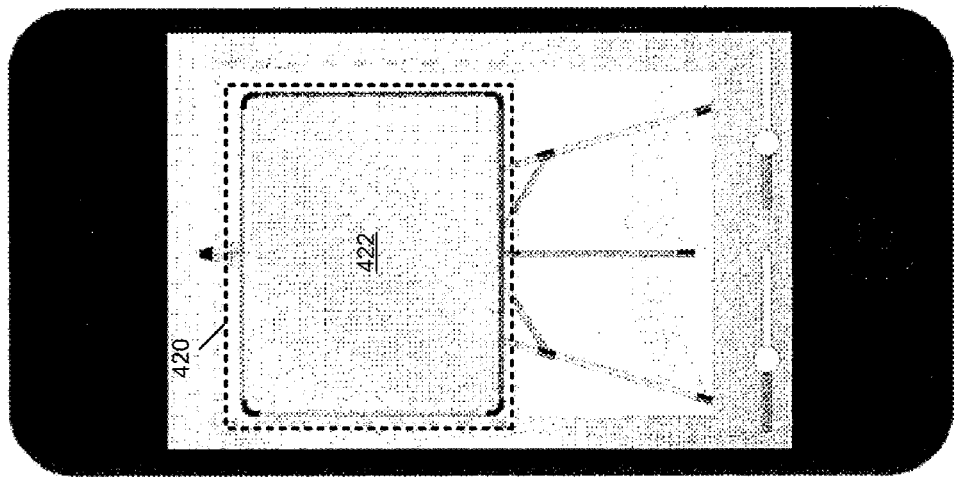
FIG. 4B depicts a mobile communications device displaying a designated location for a whiteboard on a display element of the device.

The test-taker app 304 executes steps for setting up the recording of the test-taker's performance in a standardized manner that ensures all technical requirements for quality of recording are met. Example steps in setting up the recording are illustrated in the flowchart 400 of FIG. 4A. At 402, the app 304 may determine if the mobile communications device 302 is placed in an optimal (or near optimal) position with respect to a particular item (e.g., a whiteboard) in the testing environment. In an example, a designated location for the item within a field of view captured by the mobile communications device 302 is shown in a camera view of the app 304. An example of this is illustrated in FIG. 4B. As shown in this figure, the app 304 may display an indication (e.g., a rectangle 420) of a designated location for a whiteboard 422 within the field of view captured by the mobile communications device 302. Based on this indication, the test-taker may adjust the position of the mobile communications device 302 to cause the image of the whiteboard 422 to be at the designated location within the field of view. Using computer vision analysis, the app 304 may confirm that the mobile communications device 302 is placed in an optimal (or near optimal) position with respect to the whiteboard 422.

After determining that the mobile communications device 302 is placed in an optimal position with respect to the item, at 404, the app 304 may display an indication that indicates a suggested position of the test-taker within the testing environment. In an example, the suggested position of the test-taker is shown in the camera view of the app 304. An example of this is illustrated in FIG. 4C. As shown in this figure, the app 304 may display an indication (e.g., a circle 424) of a suggested position for the test-taker's face 426 within the field of view captured by the mobile communications device 302. Based on this indication, the test-taker may adjust his position within the testing environment to cause the image of his face to be at the suggested position.

After the image of the test-taker's face is located at the suggested position in the field of view captured by the mobile communications device 302, at 406, the app 304 may track the test-taker's face. The tracking of the test-taker's face may be used to (i) ensure that the test-taker stands at the correct location in the testing environment, and (ii) to instruct the test-taker to test out the range of locomotion he or she may have during the recording. At 408, the app 304 may cause the mobile communications device 302 to sound a "warning sound" if the test-taker's face, as tracked by the app 304, is out of view within the field of view captured by the mobile communications device 302.

At 410, the app 304 may analyze audio and visual data captured by the mobile communications device 302 to ensure that (i) the test-taker's face, as captured in the recorded visual data, has enough contrast for facial-feature tracking, (ii) key gestures performed by the test-taker can be tracked, (iii) a volume of the test-taker's spoken utterances, as captured in the recorded audio data, is adequate, and (iv) a general lighting condition, as captured in the visual data, is adequate (e.g., determining that there are no unwanted glares in the visual data, etc.). In other examples, other analyses of the audio and visual data may be performed.

Figure 5:
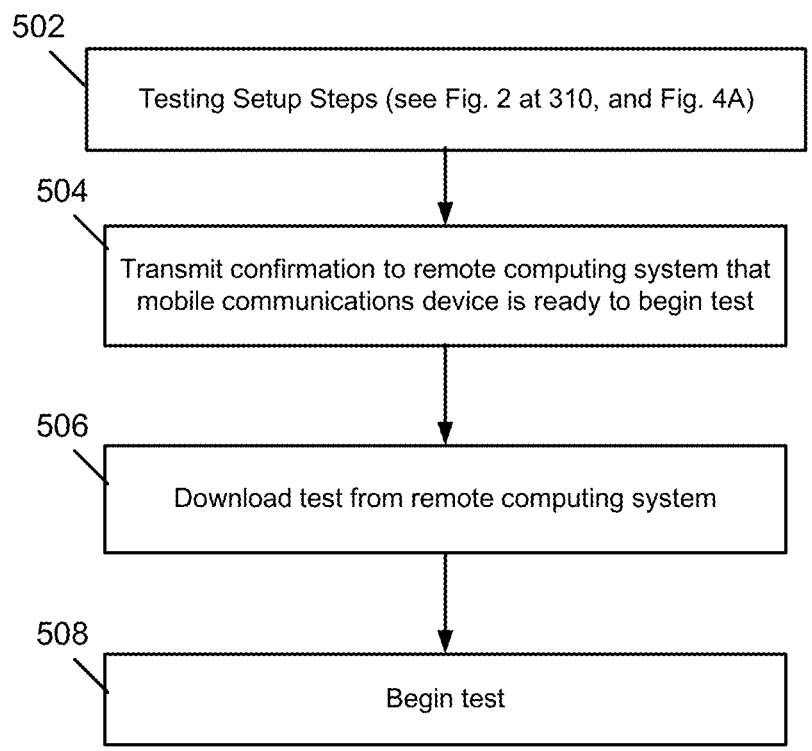
FIG. 5 is a flowchart illustrating example steps performed by a mobile communications device in starting testing.

FIG. 5 is a flowchart illustrating example steps performed by a mobile communications device in starting a performance-based evaluation. In the description of FIG. 5 below, the mobile communications device may be the test-taker's mobile communications device (e.g., the mobile communications device 104 of FIG. 1A or the mobile communications device 302 of FIG. 2). At 502, test setup steps are performed by the mobile communications device. The test setup steps may include (i) the test setup steps illustrated at 310 of FIG. 2 and described above, and (ii) the test setup steps of the flowchart 400 of FIG. 4A. As described above, the test setup steps may be performed just prior to the start of the testing and at the location in which the testing is to occur.

At 504, after the test setup steps have been performed, the test-taker app transmits a confirmation to a remote computing system, where the confirmation indicates that the test-taker's mobile communications device is ready to record the test-taker's performance. At 506, the test, detailing performance tasks that the test-taker is required to perform, is downloaded to the test-taker's mobile communications device from the remote computing system. The test-taker is then able to view the test, and at 508, testing begins.

Figure 6:
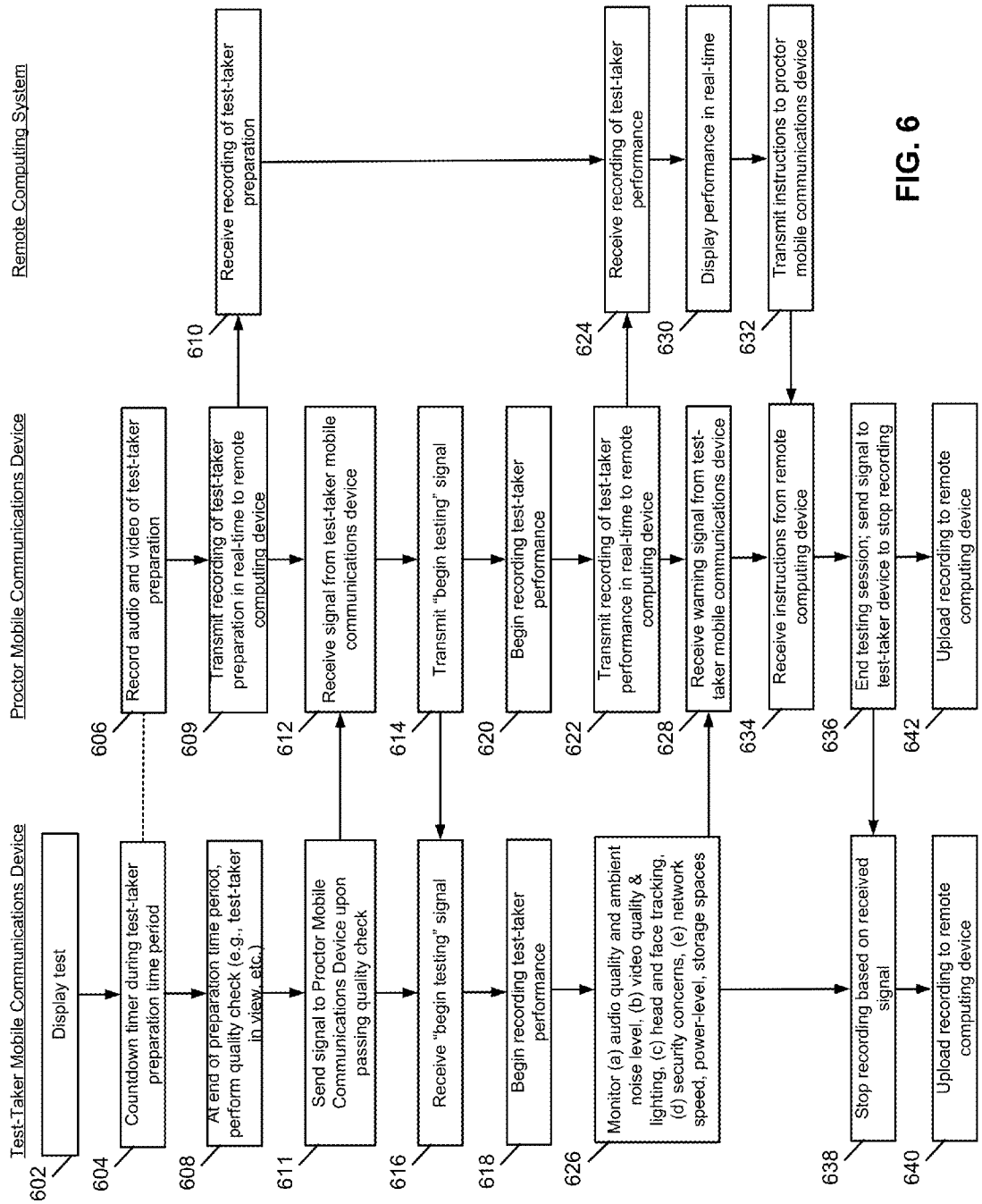
FIG. 6 is a flowchart illustrating example steps performed by a first mobile communications device (i.e., a test-taker mobile communications device), a second mobile communications device (i.e., a proctor mobile communications device), and a remote computing system.

FIG. 6 is a flowchart illustrating example steps performed by a first mobile communications device (i.e., a test-taker's mobile communications device), a second mobile communications device (i.e., a proctor's mobile communications device), and a remote computing system during testing. At 602, the test is displayed on the test-taker's mobile communications device. Alternatively, the test-taker's mobile communications device may playback audio instructions for the test. The test-taker can then prepare for his or her performance during a preparation time period that is set by the test. At 604, the test-taker's mobile communications device displays a countdown timer that indicates an amount of time left in the preparation time period. The proctor's mobile communications device may display a similar countdown timer.

During the preparation time period, at 606, the proctor's mobile communications device records audio data and visual data of the test-taker preparing. At 609, the proctor's mobile communications device transmits, in real-time or near real-time (i.e., during the preparation time period and as the audio and visual data are being recorded), the audio and visual data of the test-taker's preparation to the remote computing system. At 610, the remote computing system receives the audio and visual data of the test-taker's preparation from the proctor's mobile communications device. The receipt of the audio and visual data at the remote computing system may enable remote proctoring of the test-taker's preparation. For example, the audio and visual data may be analyzed at the remote computing system to determine if the test-taker is receiving unauthorized assistance or utilizing unauthorized material during the preparation period. In an example, the analysis of the audio and visual data is performed by the remote computing system in an automated manner, and without human intervention or requiring only minimal human intervention. In another example, the analysis of the audio and visual data is performed by a human proctor at the remote computing system.

When the preparation time period has ended, at 608, the test-taker's mobile communications device performs a quality check. The quality check may determine, for example, (i) if the test-taker's face is included in a field of view captured by the test-taker's mobile communications device and at an optimal or near-optimal position within the field of view, (ii) if one or more technical requirements are met (e.g., the test-taker's face, as captured in recorded visual data, has enough contrast for facial feature tracking, key gestures performed by the test-taker can be tracked, a volume of the test-taker's spoken utterances, as captured in recorded audio data, is adequate, and a general lighting condition, as captured in the visual data, is adequate, etc.).

After passing the quality check, at 611, the test-taker's mobile communications device sends a signal to the proctor's mobile communications device. At 612, the proctor's mobile communications device receives the signal from the test-taker's mobile communications device. Based upon the receipt of this signal, at 614, the proctor's mobile communications device transmits a "begin testing" signal to the test-taker's mobile communications device. In an example, the "begin testing" signal is transmitted based on the on-site proctor providing an input to the proctor app (e.g., pressing a "record" indication on a graphical user interface presented by the proctor app). At 616, the test-taker's mobile communications device receives the "begin testing" signal. Based on the receipt of the "begin testing" signal, at 618, the test-taker's mobile communications device begins to record audio and visual data of the test-taker's performance.

The on-site proctor's input to the proctor app or the transmission of the "begin testing" signal may also trigger recording on the proctor's mobile communications device. Thus, at 620, the proctor's mobile communications device begins to record audio and visual data of the test-taker's performance. In an example, the audio and visual data recorded on the proctor's mobile communications device provides a backup recording of the performance in case the test-taker's mobile communications device fails. At 622, the proctor's mobile communications device transmits, in real-time or near real-time (i.e., during the test-taker's performance and as the audio and visual data are being recorded), the audio and visual data of the test-taker's performance to the remote computing system. At 624, the remote computing system receives the audio and visual data of the test-taker's performance from the proctor's mobile communications device. In an example, the audio and visual data transmitted in real-time or near real-time to the remote computing system is the data recorded by the proctor's mobile communications device, which may include visual data of the "security view" described above.

The receipt of the audio and visual data at the remote computing system may enable remote proctoring of the test. For example, the audio and visual data may be analyzed at the remote computing system to determine if the test-taker is receiving unauthorized assistance or utilizing unauthorized material in the performance. In an example, the analysis of the audio and visual data is performed by the remote computing system in an automated manner, and without human intervention or requiring only minimal human intervention. In another example, the analysis of the audio and visual data is performed by a human proctor at the remote computing system. Thus, at 630, the audio and visual data received at the remote computing system may be rendered at the remote computing system, thus enabling a remote proctor to proctor the test at the remote computing system. It should be understood that the remote proctor and the remote computing system are not physically present at a location of the test-taker's performance.

At 626, during the recording of the audio and visual data of the test-taker's performance, the test-taker's mobile communications device may be configured to analyze (i) the audio data to determine if the audio data meets an audio quality requirement, (ii) the visual data to determine if the visual data meets a video quality requirement, (iii) the visual data to determine if the test-taker's face is included in a field of view captured by the test-taker's mobile communications device, (iv) the audio and visual data to determine a presence of one or more security concerns in the testing environment (e.g., to determine whether the test-taker is receiving unauthorized assistance or utilizing unauthorized material in the performance), and (v) various aspects of the test-taker's mobile communications device. These aspects may include, for example, a network connectivity of the test-taker's mobile communications device. Thus, the test-taker's mobile communications device may be configured to monitor its network connectivity during the test-taker's performance to determine its ability to send or receive data over a network. Other aspects that may be monitored include a battery level of the test-taker's mobile communications device and an amount of available storage space remaining on the device.

If any of the monitored features are determined to be unacceptable (e.g., the audio data fails to meet the audio quality requirement, the visual data fails to meet the video quality requirement, the test-taker's face is not included in the field of view captured by the test-taker's mobile communications device, one or more security concerns are present, the test-taker's device is unable to send or receive data over the network, etc.), the test-taker's mobile communications device may (i) generate an event log including details of the failure, and (ii) transmit the event log to the remote computing system. In another example, if any of the monitored features are determined to be unacceptable, the test-taker's mobile communications device may provide a warning to the test-taker (e.g., via an audible sound or a visual display). In an example, if any of the monitored features are determined to be unacceptable, the test-taker's mobile communications device may generate a warning signal that is transmitted to the proctor's mobile communications device. At 628, the proctor's mobile communications device receives the warning signal, if present. Based on its receipt of one or more warning signals, the proctor's mobile communications device may make a determination as to whether the capturing of the audio and visual data by the test-taker's and proctor's devices should be paused or terminated.

The proctor's mobile communications device may make this determination based on a severity of a problem, as indicated in the warning signal. For example, the proctor's mobile communications device may receive a warning signal from the test-taker's mobile communications device indicating that a volume of the user's voice in the audio data was below a threshold volume level for a short amount of time. Based on this warning signal, the proctor's mobile communications device may determine that recording should not be paused or terminated. By contrast, if the proctor's mobile communications device receives a warning signal that indicates a more serious issue (e.g., a warning signal indicating that the test-taker is receiving unauthorized assistance or utilizing unauthorized materials during the performance), the proctor's mobile communications device may determine that recording on the devices should be paused or terminated. If the proctor's mobile communications device determines that the capturing of the audio and visual data by the test-taker's and proctor's devices should be paused or terminated, a control signal may be transmitted from the proctor's mobile communications device to the test-taker's mobile communications device. Receipt of the control signal at the test-taker's mobile communications device may cause the capturing of the audio and visual data to be paused or terminated.

As noted above, the remote computing system may receive audio and visual data of the test-taker's performance from the proctor's mobile communications device, and this data may be analyzed at the remote computing system (e.g., in an automated manner performed by the remote computing system or by a human proctor monitoring the data). Based on the analysis of the audio and visual data, at 632, the remote computing system may transmit instructions to the proctor's mobile communications device during the testing. At 634, the instructions are received at the proctor's mobile communications device. The instructions may instruct the on-site proctor to perform certain maneuvers with his or her mobile communications device, such as changing the position or angle of the device. Some of these instructions may be pre-planned for monitoring the on-site proctor, and others may be in response to suspected security concerns or technical issues identified in the audio and visual data monitored at the remote computing system.

To end the testing session, at 636, the proctor's mobile communications device sends an "end testing" signal to the test-taker's mobile communications device. At 638, the test-taker's mobile communications device receives the "end testing" signal and terminates recording of the audio and visual data based on the received signal. Recording may also be stopped on the proctor's mobile communications device. Using the app executed on his or her mobile communications device, the proctor confirms the completion of the test and provides his or her signature indicating the authenticity of the test-taker's performance. At 640 and 642, the test-taker's mobile communications device and the proctor's mobile communications device, respectively, upload recorded audio and visual data to the remote computing system. The data may be uploaded, for example, via a wireless or wired network connection. The remote computing system may acknowledge the completion of the upload.

At the remote computing system, the uploaded audio and visual data may undergo processing that includes (i) an integrity (e.g., quality) check of the uploaded data, (ii) automatic speech recognition and/or prosody analysis performed on spoken utterances included in the audio data, (iii) tracking of the test-taker's head or face in the visual data, (iv) tracking and analysis of facial features of the test-taker, as captured in the visual data, (v) analysis of the test-taker's locomotion or body/head orientation, and (vi) recognition and analysis of gestures performed by the test-taker during the performance (e.g., pointing and emphasis gestures), among other processing. The results of such processing may be used to extract features (e.g., features 254, 256, 258, as illustrated in FIGS. 1B and 1C) from the audio and visual data, and such features may be used in an automated scoring system or a computer-assisted scoring system. The use of extracted features in an automated scoring system or a computer-assisted scoring system is described above with reference to FIGS. 1B and 1C.

The uploaded data may also be processed at the remote computing system to determine a presence of one or more security concerns in the testing environment (e.g., to determine if the test-taker received unauthorized assistance or utilized unauthorized material in his or her performance). This processing may include (i) candidate identity tracking that seeks to verify that an identity of the test-taker does not change during the test (e.g., using facial and voice gestures of the test-taker, as captured in the visual data), (ii) an analysis of environmental noise that may indicate that the test-taker is receiving unauthorized assistance or utilizing unauthorized material in his or her performance, (iii) an analysis of whether the test-taker appears to be distracted by something in the testing environment, which may indicate that the test-taker is receiving unauthorized assistance or utilizing unauthorized material in his or her performance, and (iv) processing that identifies possible test-taker cheating based on gestures of the test-taker or pauses in the test-taker's performance, among other processing. The processing performed at the remote computing system may be conducted on cloud-based resources such as Amazon EC2, in an embodiment. It should be appreciated that the processing to determine a presence of security concerns may be performed on the data that is uploaded at the completion of the performance, or such processing may be performed on the data that is streamed from the proctor's device to the remote computing system in real-time and during the performance. Such processing of the streamed data may enable the remote computing system to (i) identify security concerns during the performance, and (ii) transmit warning signals or instructions to the proctor's mobile communications device based on these identified concerns.

Following testing, the test-taker app executed on the test-taker's mobile communications device may provide a notification to the test-taker when scores for the test are available. In an example, the test-taker's score indicates a pass/fail result. The test-taker's app may further provide the test-taker with the option to review his or her performance and receive feedback on the performance. Thus, the test-taker's app may provide the test-taker with the ability to (i) review the score and video of the performance, (ii) review the score, the video, human-generated scores on various aspects of the performance, and computer-generated scores on various aspects of the performance, (iii) review the score, the video, the human-generated scores, the computer-generated scores, and a comparison of the scores to scores of a norm group, and (iv) review comments and feedback from an expert teacher or coach. The test-taker's app may also suggest options for the test-taker (e.g., methods to contact customer service or report discrepancies, options for retaking the test, options to register complaints, etc.). The test-taker app may further link the test-taker's performance to recruitment services, job openings, and teacher training services.

The approaches described herein may enable evaluation of a test-taker's performance using the test-taker's own mobile communications device. However, for test-takers without an adequate device and/or adequate Internet access, a mail-in testing kit may be used. Thus, when registering to complete a performance-based assessment, the test-taker may indicate his or her need to use a mail-in testing kit. The mail-in testing kit may include a mobile communications device (e.g., an iPod Touch device, a smartphone, an iPad, or another device) that has the test-taker app pre-loaded on the device. The device may be mailed to the company administering the test or the company scoring the test after the recording of the assessment is complete. In instances where the test-taker does not have adequate Internet access, data for the assessment (e.g., including the actual test items) may be saved on the device in encrypted form and decrypted just prior to the assessment. In an example, the recording of the performance may be saved in an encrypted form on the device prior to mailing the device to the company administering the test or the company scoring the test. Upon receipt of the device by the company administering the test or the company scoring the test, the recorded data may be automatically uploaded to the remote computing system described herein.

Figure 7:
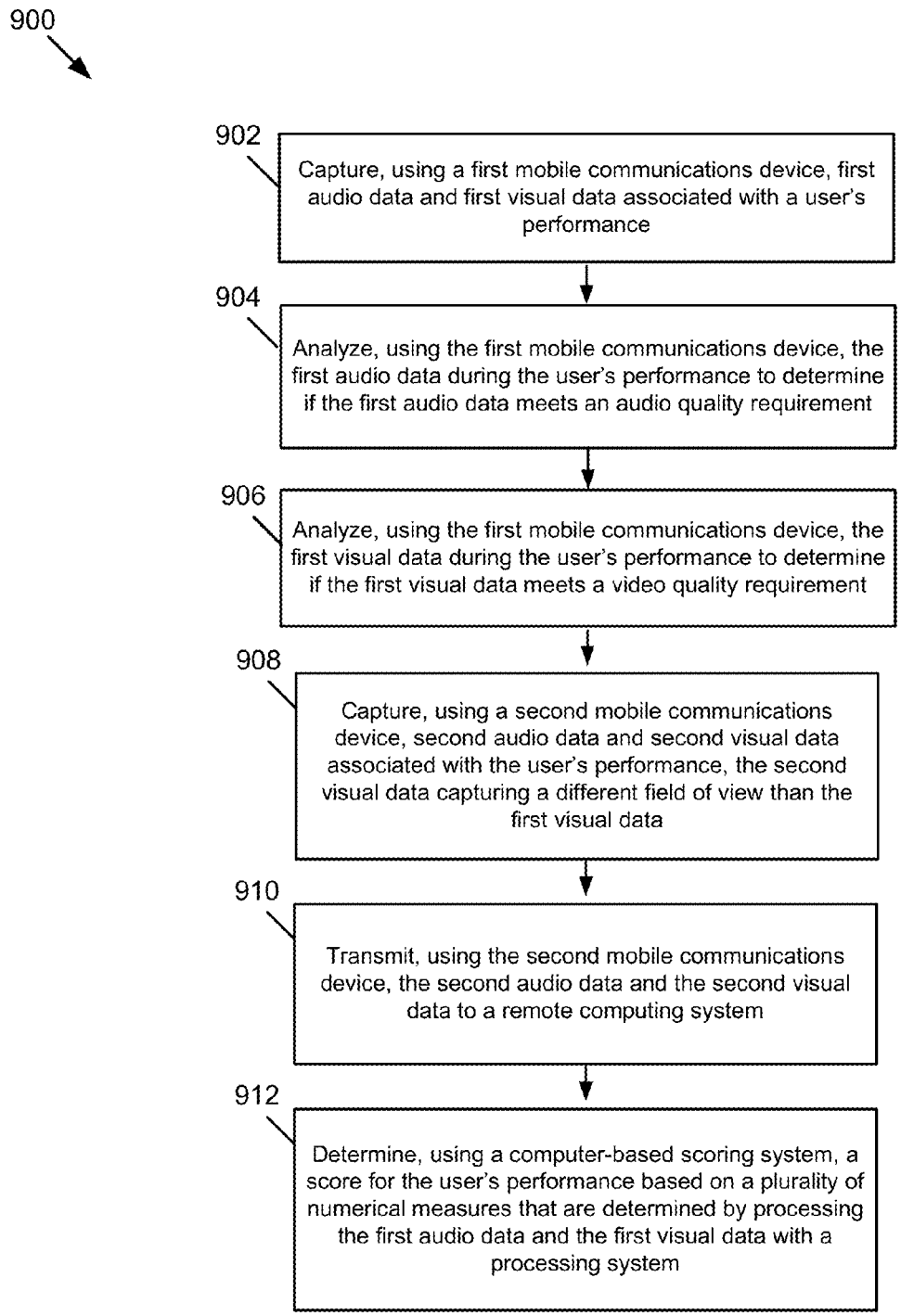
FIG. 7 is a flowchart depicting operations of an example method of evaluating a user's performance.

FIG. 7 is a flowchart depicting operations of an example method of evaluating a user's performance. At 902, using a first mobile communications device, first audio data and first visual data associated with the user's performance are captured. At 904, using the first mobile communications device, the first audio data is analyzed during the user's performance to determine if the first audio data meets an audio quality requirement. At 906, using the first mobile communications device, the first visual data is analyzed during the user's performance to determine if the first visual data meets a video quality requirement. At 908, using a second mobile communications device, second audio data and second visual data associated with the user's performance are captured, the second visual data capturing a different field of view than the first visual data. At 910, using the second mobile communications device, the second audio data and the second visual data are transmitted to a remote computing system. The second audio data and the second visual data are analyzed at the remote computing system to determine if the user is receiving unauthorized assistance or utilizing unauthorized material in the performance. At 912, using a computer-based scoring system, a score for the user's performance is determined based on a plurality of numerical measures that are determined by processing the first audio data and the first visual data with a processing system. The score is determined automatically and without human intervention (or requiring only minimal human intervention).

In determining the score automatically and without human intervention (or requiring only minimal human intervention), multimodal features from the first audio and visual data may be extracted. In some embodiments, the features extracted may be generally classified as either "delivery" features or "content" features. Delivery features may include both verbal delivery features and non-verbal delivery features Verbal delivery features may include, but are not limited to, prosody, disfluencies (e.g., usage of filler words such as "ah" or "um"), word choice, grammar, speech rate, tone, etc. Non-verbal delivery features may include, but are not limited to, body language, facial expression, and/or the like that provide cues for the user's personality, attentiveness, mood, agreeableness, extraversion, conscientiousness, neuroticism, openness to experience, and/or the like. For example, maintaining eye contact with the first mobile communications device may be a positive cue, whereas fidgeting and nail biting may be negative cues (e.g., indicative of nervousness and/or lack of confidence).

Non-verbal delivery features may be extracted using a variety of technologies. A delivery feature extraction module may evaluate the first audio and visual data and/or augmented data (e.g., a time-stamped log of the recording, Kinect gesture data, etc.). For example, in one implementation, the delivery feature extraction module may utilize technology developed by Emotient, for example, to automatically measure the user's attention, engagement, and emotion based on the first audio and visual data. As another example, the delivery feature extraction module may also utilize FaceTrack, developed by Visage Technologies, to track the user's facial features, including eye gaze direction. The delivery feature extraction module may also utilize movement/gesture recognition technology, such as Microsoft's Kinect, to detect and identify body movement. The extracted non-verbal delivery features may be represented by numerical values, vectors of values, etc. For example, an emotion feature may be represented by a vector of values, each value representing a confidence measure (e.g., in percentage points) for a primary emotion. For instance, an emotion vector may include five values that correspond to five emotions (e.g., happiness, anger, fear, guilt, sadness). Thus, an exemplary vector of $\{0.51, 0.27, 0.05, 0, 0.13\}$ may indicate that the emotion detector is 51% confident that happiness is detected, 27% confident that anger is detected, 5% confident that fear is detected, and so on. As another example, an eye gaze feature may include a single numerical value representing the angle (in degrees) of the user's gaze relative to a horizontal line of sight or to the first mobile communications device. Other examples of non-verbal delivery features may include, for example, binary values representing whether fidgeting is detected, etc.

The delivery feature extraction module may utilize a variety of technologies to extract verbal delivery features. For example, to extract prosodic features, the delivery feature extraction module may implement the teachings of Educational Testing Service's U.S. Patent Publication 2012/0245942, "Computer-Implemented Systems and Methods for Evaluating Prosodic Features of Speech," which is hereby incorporated by reference in its entirety. If a transcription of the first audio data is needed, automatic speech recognition technology may be used to analyze the first audio data and generate a corresponding transcription. The transcription may be analyzed to identify, for example, speech disfluencies (e.g., use of filler words, such as "like," "you know," "um," etc.). The extracted verbal delivery features may each be represented by a numerical value, a vector of numerical values, and/or the like.

In addition to delivery features, the system may also extract content features from the first audio data. The content features may include, but are not limited to, responsiveness to an item (e.g., an item to which the user's performance is in response) and other content-related measures. In some embodiments, the content features may be extracted using a content feature extraction module. For example, the content of spoken utterances included in the user's performance (e.g., as reflected in the first audio data) may be compared to the content of spoken utterances included in a model performance. In one implementation, the first audio data may be analyzed using automatic speech recognition technology to extract a transcription of spoken utterances included in the user's performance. The content feature extraction module may then compare the transcription to a set of model texts. The comparisons may utilize, for example, content vector analysis, semantic distances, and/or other methods of measuring content relevance. Results from the comparisons may then be used to generate a numerical feature score for content features. In one implementation, the feature score may be determined based on a predetermined rubric. For example, model texts may be classified into three hierarchical classes: high, medium, and low. If the user's transcription closely matches model texts in the "high" category, a corresponding content feature score may be assigned.

In another example, topic models may be used to determine a content score. In one implementation, content from a collection of example performances may be analyzed using Latent Dirichlet Allocation (LDA) to derive k topic models. By comparing the topic models to content from a set of model/ideal performances, the system may identify which of the topic models are likely predictive of desired content. The system may then apply those selected topic models to the transcription to generate a content feature value.

After the delivery features and content features have been extracted, the extracted features may be processed by a scoring model and transformed into the score (e.g., the score determined at step 912 of FIG. 7). The scoring model may be represented by, for example, a mathematical framework, such as a linear combination of weighted features, a random forest, and/or the like. The scoring model may transform the delivery features and content features into the score, which represents a quantitative measure of the user's performance. Unlike conventional scoring models, the scoring model may take into account both delivery features and content features of the user's performance.

In one embodiment, supervised machine learning may be used to train the scoring model. Audiovisual data for training the scoring model may be generated (e.g., a "training user" may perform a "training performance," and audiovisual data of the training performance may be recorded). The audiovisual data may, depending on need, be analyzed using automated speech recognition to derive a corresponding transcription. The audiovisual data and/or the corresponding transcription may then be analyzed. As described above, a delivery feature extraction module may analyze the audiovisual data and/or the transcription to extract one or more delivery features. Again, the delivery features may include both verbal and non-verbal delivery features (e.g., numerical representations for body language, mood, facial expression, prosody, speech rate, disfluencies, etc.). Also as described above, a content feature extraction module may analyze the transcription to extract one or more content features. In addition, the audiovisual data may be analyzed by a human scorer, who may assign a human-determined score to the audiovisual data.

The extracted delivery features, content features, and human-determined score may then be used to train a scoring model for scoring a user performance. The scoring model may be represented by a mathematical framework, such as a linear combination, logarithmic model, random forest prediction model, etc. For example, if using a linear combination, the response scoring model may be represented as:

$$S = d_1 \cdot D_1 + d_2 \cdot D_2 + \ldots + d_i \cdot D_i + c_1 \cdot C_1 + c_2 \cdot C_2 + \ldots + c_j \cdot C_j,$$

where dependent variable S represents a score, independent variables D1 to Di represent delivery features, coefficients d1 to di represent weights for the delivery features, independent variables C1 to Cj represent content features, and coefficients c1 to cj represent weights for the content features. During model training, the extracted delivery features, extracted content features, and human-determined score associated with the same training audiovisual data would form a data set. The extracted delivery features would replace the independent variables D1 to Di, the extracted content features would replace the independent variables C1 to Cj, and the human-determined score would replace the dependent variable S. Additional audiovisual data for training the scoring model may be generated. Once sufficient training data has been generated, the scoring model may be trained using well-known supervised machine learning methods, such as linear regression, logarithmic regression, etc. Referring again to the linear combination example above, linear regression may be used to determine values for the aforementioned coefficients d1 to di and c1 to cj. The coefficient values may then replace the coefficient variables in the scoring model, thereby configuring the model to predict scores on user performances.

Figure 8A:
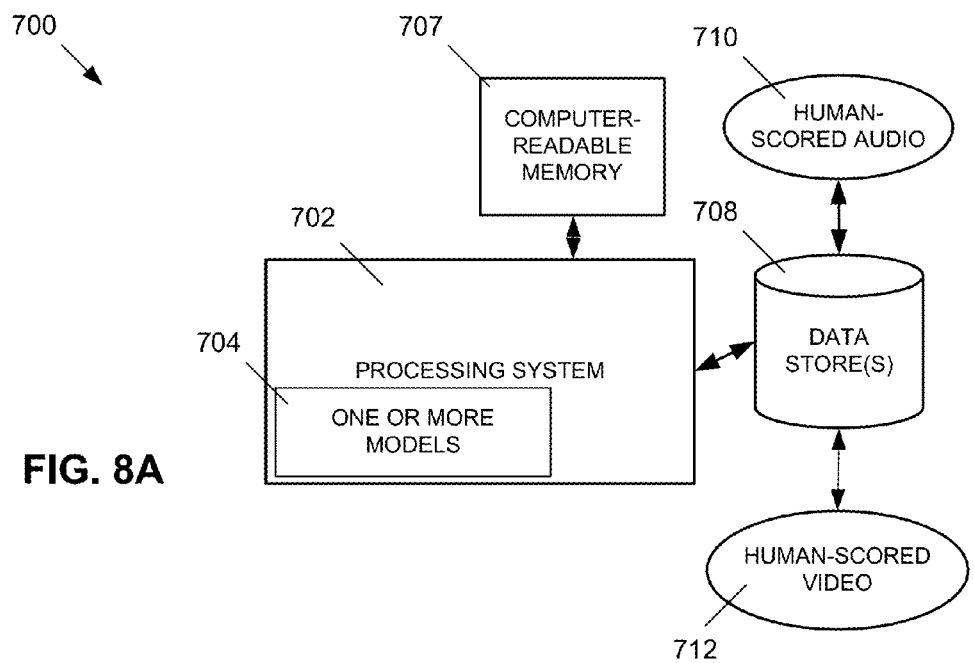
FIGS. 8A, 8B, and 8C depict example systems for evaluating a user's performance.
Figure 8B:
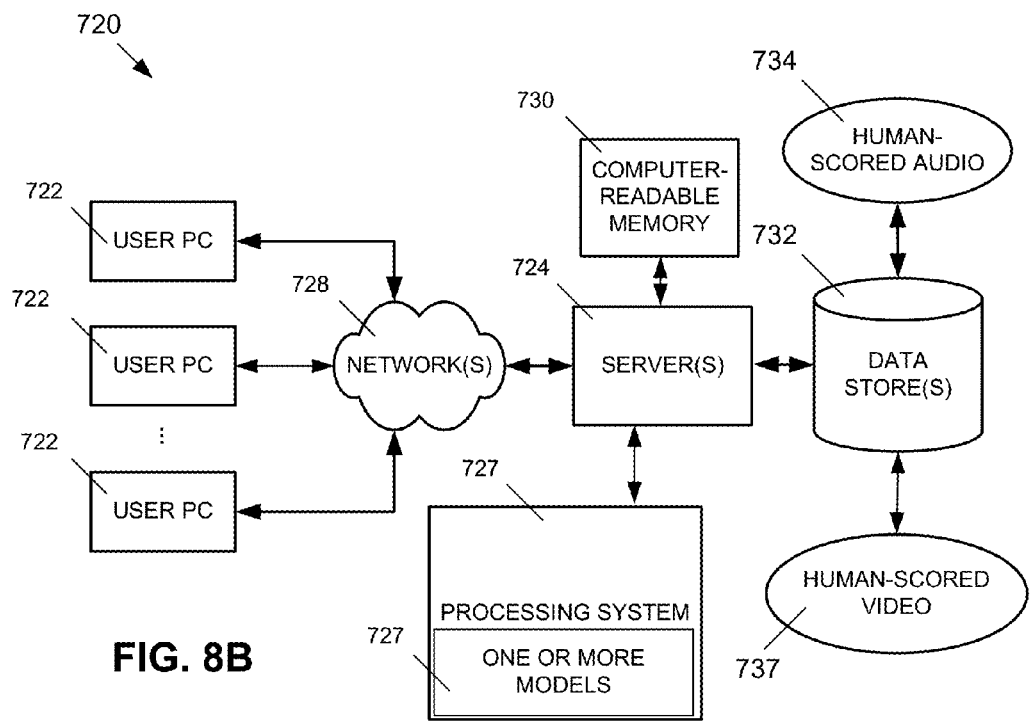
Figure 8C:
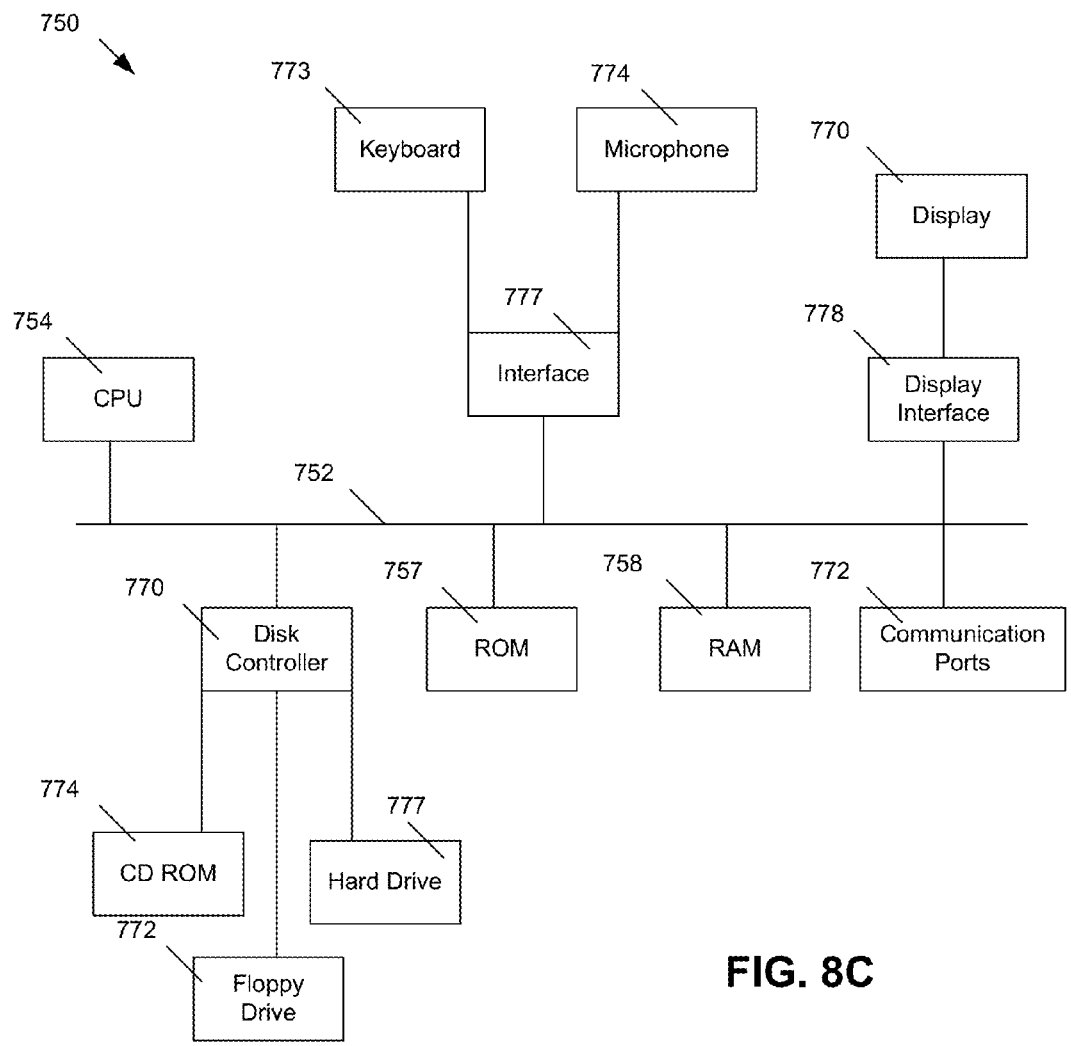

FIGS. 8A, 8B, and 8C depict example systems for evaluating a user's performance. For example, FIG. 8A depicts an exemplary system 700 that includes a standalone computer architecture where a processing system 702 (e.g., one or more computer processors located in a given computer or in multiple computers that may be separate and distinct from one another) includes one or more models 704 being executed on the processing system 702. The processing system 702 has access to a computer-readable memory 706 in addition to one or more data stores 708. The one or more data stores 708 may include human-scored audio 710 as well as human-scored video 712. The processing system 702 may be a distributed parallel computing environment, which may be used to handle very large-scale data sets.

FIG. 8B depicts a system 720 that includes a client-server architecture. One or more user PCs 722 access one or more servers 724 running one or more models 726 on a processing system 727 via one or more networks 728. The one or more servers 724 may access a computer-readable memory 730 as well as one or more data stores 732. The one or more data stores 732 may contain human-scored audio 734 as well as human-scored video 737.

FIG. 8C shows a block diagram of exemplary hardware for a standalone computer architecture 750, such as the architecture depicted in FIG. 8A that may be used to contain and/or implement the program instructions of system embodiments of the present disclosure. A bus 752 may serve as the information highway interconnecting the other illustrated components of the hardware. A processing system 754 labeled CPU (central processing unit) (e.g., one or more computer processors at a given computer or at multiple computers), may perform calculations and logic operations required to execute a program. A non-transitory processor-readable storage medium, such as read only memory (ROM) 756 and random access memory (RAM) 758, may be in communication with the processing system 754 and may contain one or more programming instructions for performing the method for evaluating a user's performance. Optionally, program instructions may be stored on a non-transitory computer-readable storage medium such as a magnetic disk, optical disk, recordable memory device, flash memory, or other physical storage medium.

In FIGS. 8A, 8B, and 8C, computer readable memories 706, 730, 756, 758 or data stores 708, 732, 762, 764, 766 may include one or more data structures for storing and associating various data used in the example systems for evaluating a user's performance. For example, a data structure may be used to relate variables of a scoring model with associated weighting factors. Other aspects of the example systems for evaluating a user's performance may be stored and associated in the one or more data structures (e.g., numerical measures, scores for human-scored reference responses, etc.).

A disk controller 760 interfaces one or more optional disk drives to the system bus 752. These disk drives may be external or internal floppy disk drives such as 762, external or internal CD-ROM, CD-R, CD-RW or DVD drives such as 764, or external or internal hard drives 766. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 760, the ROM 756 and/or the RAM 758. The processor 754 may access one or more components as required.

A display interface 768 may permit information from the bus 752 to be displayed on a display 770 in audio, graphic, or alphanumeric format. Communication with external devices may optionally occur using various communication ports 772.

In addition to these computer-type components, the hardware may also include data input devices, such as a keyboard 773, or other input device 774, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A system for evaluating a user's performance, the system comprising:
    a first mobile communications device configured to:
        capture first audio data and first visual data associated with a user's performance,
        analyze the first audio data during the user's performance to determine if the first audio data meets an audio quality requirement, and generate a first signal based on a determination that the first audio data does not meet the audio quality requirement,
        analyze the first visual data during the user's performance to determine if the first visual data meets a video quality requirement, and generate a second signal based on a determination that the first visual data does not meet the video quality requirement;
    a second mobile communications device configured to:
        capture second audio data and second visual data associated with the user's performance, the second visual data capturing a different field of view than the first visual data,
        transmit the second audio data and the second visual data to a remote computing system, the remote computing system (i) analyzing the second audio data and the second visual data, (ii) determining if the user is receiving unauthorized assistance or utilizing unauthorized material in the performance, and (iii) transmitting a third signal to the second mobile communications device based on a determination that the user is receiving the unauthorized assistance or utilizing the unauthorized material, and
        terminate the capturing of the audio and visual data by the first and second mobile communications devices based on a receipt of the first, second, or third signals, the second mobile communications device being configured to (i) receive the first and second signals from the first mobile communications device, and (ii) transmit a signal to the first mobile communications device to terminate the capturing of the first audio and visual data; and
    a computer-based scoring system configured to determine a score for the user's performance based on a plurality of numerical measures that are determined by processing the first audio data and the first visual data with a computer processing system, the score being determined automatically and without human intervention.

2. The system of claim 1, wherein the user's performance includes a spoken utterance, and wherein the computer-based scoring system is configured to:
    process the first audio data with the computer processing system to generate a text that is representative of the spoken utterance;
    process the text with the computer processing system to determine a first numerical measure indicative of a content of the spoken utterance;
    process the first audio data with the computer processing system to determine a second numerical measure indicative of the user's delivery of the spoken utterance;
    process the first visual data with the computer processing system to determine a third numerical measure indicative of a behavior of the user during the performance; and
    apply a numerical, computer-based scoring model to the first numerical measure, the second numerical measure, and the third numerical measure to automatically determine the score for the user's performance, the numerical, computer-based scoring model including
        a first variable and an associated first weighting factor, the first variable receiving a value of the first numerical measure,
        a second variable and an associated second weighting factor, the second variable receiving a value of the second numerical measure, and
        a third variable and an associated third weighting factor, the third variable receiving a value of the third numerical measure.

3. The system of claim 1,
    wherein the first mobile communications device is configured to (i) analyze the first visual data during the user's performance to determine if the user's face is included in a field of view captured in the first visual data, (ii) generate a fourth signal based on a determination that the user's face is not included in the field of view captured in the first visual data, and (iii) transmit the fourth signal to the second mobile communications device; and
    wherein the second mobile communications device is configured to terminate the capturing of the audio and visual data by the first and second mobile communications devices based on a receipt of the fourth signal.

4. The system of claim 3, wherein the first mobile communications device is configured to generate an audible sound based on the determination that the user's face is not included in the field of view captured in the first visual data.

5. The system of claim 1,
    wherein the first mobile communications device is configured to (i) receive a first GPS signal from a satellite, (ii) determine a location of the first mobile communications device based on the first GPS signal, and (iii) determine if the location of the first mobile communications device matches a designated location at which the user's performance is required to occur; and
    wherein the second mobile communications device is configured to (i) receive a second GPS signal from a satellite, (ii) determine a location of the second mobile communications device based on the second GPS signal, and (iii) determine if the location of the second mobile communications device matches the designated location at which the user's performance is required to occur.

6. The system of claim 1,
wherein the first mobile communications device is configured to (i) analyze the first audio data and the first visual data during the user's performance to determine if the user is receiving the unauthorized assistance or utilizing the unauthorized material in the performance, (ii) generate a fourth signal based on a determination that the user is receiving the assistance or utilizing the material, and (iii) transmit the fourth signal to the second mobile communications device; and
wherein the second mobile communications device is configured to terminate the capturing of the audio and visual data by the first and second mobile communications devices based on a receipt of the fourth signal.

7. The system of claim 1, wherein the determination of whether the first audio data meets the audio quality requirement comprises:
comparing a noise level in the first audio data to a threshold noise level; and
comparing a volume of a spoken utterance included in the first audio data to a threshold volume level.

8. The system of claim 1, wherein the determination of whether the first visual data meets the video quality requirement comprises:
determining if a lighting condition in the first visual data meets a lighting requirement; and
determining if the user's face, as captured in the first visual data, has a contrast that meets a facial-contrast requirement.

9. The system of claim 1, wherein the second mobile communications device is configured to transmit the second audio data and the second visual data to the remote computing system in real-time and during the user's performance, the field of view of the second visual data being larger than that of the first visual data and capturing a larger amount of an environment in which the user's performance occurs as compared to the first visual data.

10. The system of claim 1,
wherein the first mobile communications device is configured to (i) monitor a network connectivity of the first mobile communications device during the user's performance to determine an ability of the first mobile communications device to send or receive data over a network, (ii) generate a fourth signal based on a determination that the first mobile communications device is unable to send or receive data over the network, and (iii) transmit the fourth signal to the second mobile communications device; and
wherein the second mobile communications device is configured to terminate the capturing of the audio and visual data by the first and second mobile communications devices based on a receipt of the fourth signal.

11. A method of evaluating a user's performance, the method comprising:
capturing, using a first mobile communications device, first audio data and first visual data associated with a user's performance;
analyzing, using the first mobile communications device, the first audio data during the user's performance to determine if the first audio data meets an audio quality requirement;
generating a first signal based on a determination that the first audio data does not meet the audio quality requirement;
analyzing, using the first mobile communications device, the first visual data during the user's performance to determine if the first visual data meets a video quality requirement;
generating a second signal based on a determination that the first visual data does not meet the video quality requirement;
capturing, using a second mobile communications device, second audio data and second visual data associated with the user's performance, the second visual data capturing a different field of view than the first visual data;
transmitting, using the second mobile communications device, the second audio data and the second visual data to a remote computing system, the remote computing system (i) analyzing the second audio data and the second visual data, (ii) determining if the user is receiving unauthorized assistance or utilizing unauthorized material in the performance, and (iii) transmitting a third signal to the second mobile communications device based on a determination that the user is receiving the unauthorized assistance or utilizing the unauthorized material;
terminating, using the second mobile communications device, the capturing of the audio and visual data by the first and second mobile communications devices based on a receipt of the first, second, or third signals, the second mobile communications device being configured to (i) receive the first and second signals from the first mobile communications device, and (ii) transmit a signal to the first mobile communications device to terminate the capturing of the first audio and visual data; and
determining, using a computer-based scoring system, a score for the user's performance based on a plurality of numerical measures that are determined by processing the first audio data and the first visual data with a computer processing system, the score being determined automatically and without human intervention.

12. The method of claim 11, wherein the user's performance includes a spoken utterance, and wherein the determining of the score using the computer-based scoring system comprises:
processing the first audio data with the computer processing system to generate a text that is representative of the spoken utterance;
processing the text with the computer processing system to determine a first numerical measure indicative of a content of the spoken utterance;
processing the first audio data with the computer processing system to determine a second numerical measure indicative of the user's delivery of the spoken utterance;
processing the first visual data with the computer processing system to determine a third numerical measure indicative of a behavior of the user during the performance; and
applying a numerical, computer-based scoring model to the first numerical measure, the second numerical measure, and the third numerical measure to automatically determine the score for the user's performance, the numerical, computer-based scoring model including a first variable and an associated first weighting factor, the first variable receiving a value of the first numerical measure, a second variable and an associated second weighting factor, the second variable receiving a value of the second numerical measure, and a third variable and an associated third weighting factor, the third variable receiving a value of the third numerical measure.

13. The method of claim 11 comprising:

analyzing, using the first mobile communications device, the first visual data during the user's performance to determine if the user's face is included in a field of view captured in the first visual data.

14. The method of claim 13 comprising:

generating, using the first mobile communications device, an audible sound based on a determination that the user's face is not included in the field of view captured in the first visual data.

15. The method of claim 11 comprising:

receiving, using the first mobile communications device, a first GPS signal from a satellite;

determining, using the first mobile communications device, a location of the first mobile communications device based on the first GPS signal;

determining, using the first mobile communications device, if the location of the first mobile communications device matches a designated location at which the user's performance is required to occur;

receiving, using the second mobile communications device, a second GPS signal from a satellite;

determining, using the second mobile communications device, a location of the second mobile communications device based on the second GPS signal; and determining, using the second mobile communications device, if the location of the second mobile communications device matches the designated location at which the user's performance is required to occur.

16. The method of claim 11 comprising:

analyzing, using the first mobile communications device, the first audio data and the first visual data during the user's performance to determine if the user is receiving the unauthorized assistance or utilizing the unauthorized material in the performance.

17. The method of claim 11, wherein the determination of whether the first audio data meets the audio quality requirement comprises:

comparing a noise level in the first audio data to a threshold noise level; and comparing a volume of a spoken utterance included in the first audio data to a threshold volume level.

18. The method of claim 11, wherein the determination of whether the first visual data meets the video quality requirement comprises:

determining if a lighting condition in the first visual data meets a lighting requirement; and determining if the user's face, as captured in the first visual data, has a contrast that meets a facial-contrast requirement.

19. The method of claim 11, wherein the transmitting of the second audio data and the second visual data to the remote computing system is in real-time and during the user's performance, the field of view of the second visual data being larger than that of the first visual data and capturing a larger amount of an environment in which the user's performance occurs as compared to the first visual data.

20. The method of claim 11 comprising:

analyzing, using the first mobile communications device, a network connectivity of the first mobile communications device during the user's performance to determine an ability of the first mobile communications device to send or receive data over a network.

\* \* \* \* \*